(12) United States Patent
Chen et al.

(10) Patent No.: US 9,736,089 B2
(45) Date of Patent: Aug. 15, 2017

(54) SYSTEM AND METHOD FOR ENABLING VOICE AND VIDEO COMMUNICATIONS USING A MESSAGING APPLICATION

(71) Applicant: Blackberry Limited, Waterloo (CA)

(72) Inventors: Henry Yao-Tsu Chen, Redmond, WA (US); Jennifer Anne Pretti, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 886 days.

(21) Appl. No.: 13/648,883

(22) Filed: Oct. 10, 2012

(65) Prior Publication Data
US 2013/0111365 A1    May 2, 2013

Related U.S. Application Data

(60) Provisional application No. 61/554,752, filed on Nov. 2, 2011.

(51) Int. Cl.
| | | |
|---|---|---|
| *H04M 1/663* | (2006.01) | |
| *H04L 12/58* | (2006.01) | |
| *H04M 1/725* | (2006.01) | |

(52) U.S. Cl.
CPC .......... *H04L 51/043* (2013.01); *H04L 51/046* (2013.01); *H04L 51/10* (2013.01); *H04M 1/663* (2013.01); *H04M 1/72555* (2013.01); *H04M 1/72552* (2013.01); *H04M 2250/60* (2013.01)

(58) Field of Classification Search
CPC ................................. H04L 51/10; H04L 67/24
See application file for complete search history.

(56) References Cited

U.S. PATENT DOCUMENTS

| | | | | |
|---|---|---|---|---|
| 7,412,486 | B1 * | 8/2008 | Petrack et al. ................ | 709/206 |
| 7,640,293 | B2 * | 12/2009 | Wilson ................ | H04L 12/1827 |
| | | | | 709/203 |
| 7,912,903 | B2 | 3/2011 | Shah | |

(Continued)

FOREIGN PATENT DOCUMENTS

| | | |
|---|---|---|
| WO | 2006017242 A2 | 2/2006 |
| WO | 2009026367 A1 | 2/2009 |

OTHER PUBLICATIONS

International Search report mailed Feb. 19, 2013, in corresponding PCT patent application No. PCT/CA2012/050713.

(Continued)

*Primary Examiner* — Abdullah Al Kawsar
*Assistant Examiner* — Phoebe Pan
(74) *Attorney, Agent, or Firm* — Jon Gibbons; Fleit Gibbons Gutman Bongini & Bianco P.L.

(57) ABSTRACT

A method and system are provided for enabling voice communications via a messaging application. The method comprises enabling an instant messaging (IM) presence status option to be selected; and blocking an incoming voice communication when the presence status option has been selected. A method and system are also provided comprising displaying a first instant message in an instant messaging conversation user interface comprising call status information; and displaying updated call status information in the instant messaging conversation user interface after determining whether an call attempt has been successful.

15 Claims, 36 Drawing Sheets

(56) References Cited

U.S. PATENT DOCUMENTS

| | | | |
|---|---|---|---|
| 8,068,588 B2 * | 11/2011 | Ramanathan | H04L 51/14 370/329 |
| 8,644,461 B2 * | 2/2014 | Ramanathan | H04L 51/14 370/230 |
| 8,805,346 B1 * | 8/2014 | Zhang | H04M 3/42042 455/414.1 |
| 2002/0076025 A1 * | 6/2002 | Liversidge | G06Q 10/10 379/202.01 |
| 2003/0063732 A1 * | 4/2003 | Mcknight | H04M 1/274575 379/210.01 |
| 2003/0123634 A1 * | 7/2003 | Chee | 379/220.01 |
| 2004/0162881 A1 * | 8/2004 | Digate | G06Q 10/10 709/206 |
| 2004/0193684 A1 * | 9/2004 | Ben-Yoseph | H04L 12/5815 709/204 |
| 2004/0203766 A1 * | 10/2004 | Jenniges | H04L 67/26 455/435.1 |
| 2004/0215723 A1 | 10/2004 | Chadha | |
| 2004/0235520 A1 * | 11/2004 | Cadiz et al. | 455/557 |
| 2005/0027867 A1 | 2/2005 | Mueller et al. | |
| 2005/0166154 A1 | 7/2005 | Wilson et al. | |
| 2006/0010200 A1 | 1/2006 | Mousseau et al. | |
| 2006/0023695 A1 | 2/2006 | Yarlagadda et al. | |
| 2006/0148499 A1 | 7/2006 | Chie | |
| 2006/0177013 A1 * | 8/2006 | Frifeldt et al. | 379/67.1 |
| 2008/0285736 A1 | 11/2008 | Balk et al. | |
| 2009/0003542 A1 * | 1/2009 | Ramanathan | H04L 51/14 379/88.13 |
| 2009/0041217 A1 | 2/2009 | Balk et al. | |
| 2009/0049125 A1 | 2/2009 | Channabasavaiah | |
| 2009/0113452 A1 | 4/2009 | Grigsbym et al. | |
| 2009/0268716 A1 * | 10/2009 | Lamb | H04L 12/5885 370/352 |
| 2009/0282138 A1 | 11/2009 | Haynes et al. | |
| 2009/0304167 A1 * | 12/2009 | Wright | H04M 3/436 379/142.05 |
| 2011/0202956 A1 * | 8/2011 | Connelly et al. | 725/38 |
| 2011/0302253 A1 * | 12/2011 | Simpson-Anderson | H04L 51/04 709/206 |
| 2012/0059892 A1 * | 3/2012 | Ramanathan | H04L 51/14 709/206 |

OTHER PUBLICATIONS

"Microsoft Office Communication 2007 R2 Getting Started Guide", Microsoft, online document, Dec. 2008 (Dec. 2008) retrieved from http://www.microsoft.com/en-ca/download/details.aspx?id=8683 pp. 26, 31,53,64,68 and 73.

Mike Mintz, "MSN Messenger Protocol—Notification—Statuses", online documents, Internet Archive WaybackMachine, captured on Feb. 6, 2004, retrieved from http://web.archive.org/web/20040206171414/http://www.hypothetic.org/docs/msn/sitev2.0/notification/statuses.php?printable=gray.

Extended European Search Report mailed Mar. 6, 2013, in corresponding European patent application No. 12187923.3.

Extended European Search Report dated Mar. 1, 2017, received for European Application No. 16200217.4.

* cited by examiner

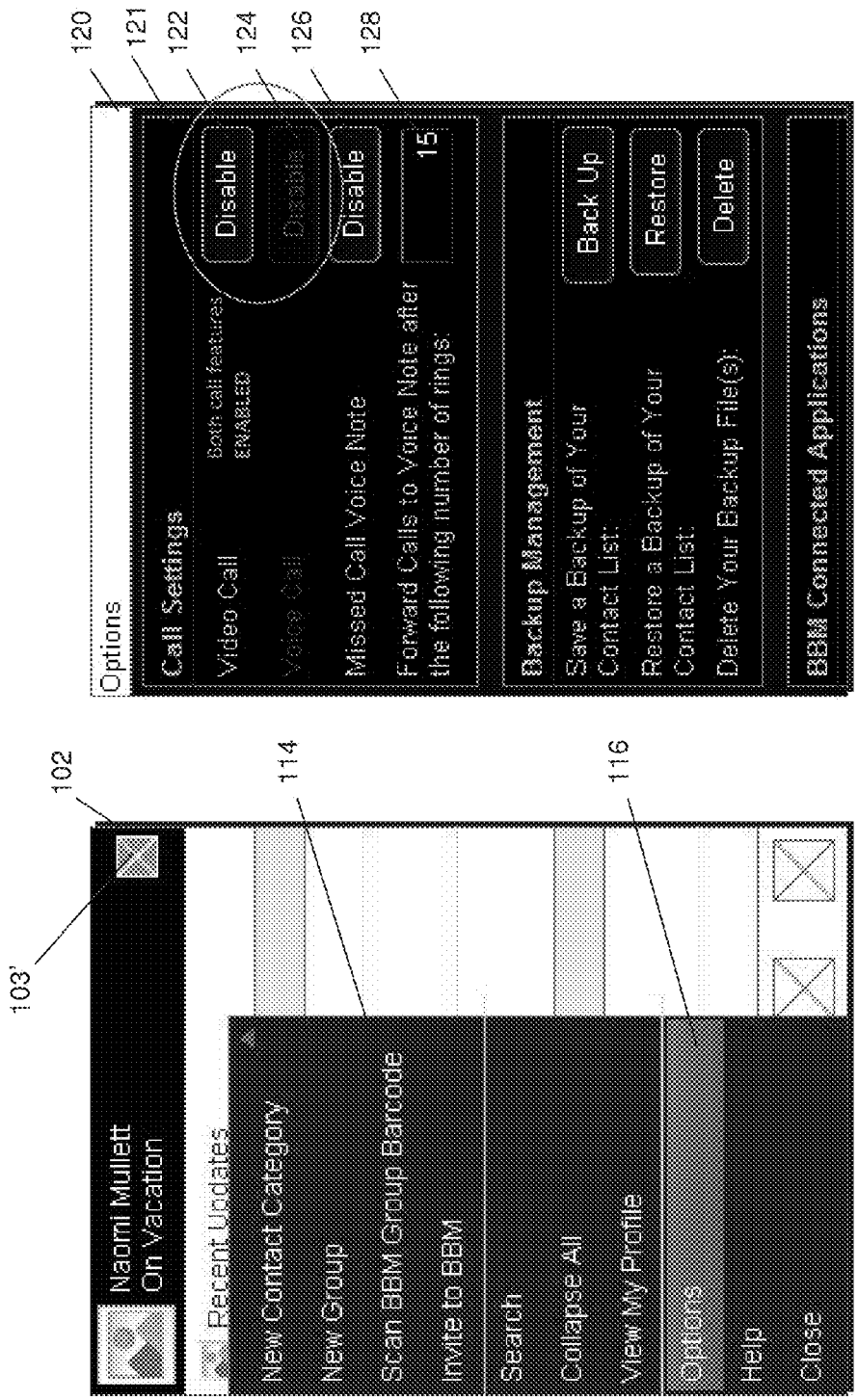

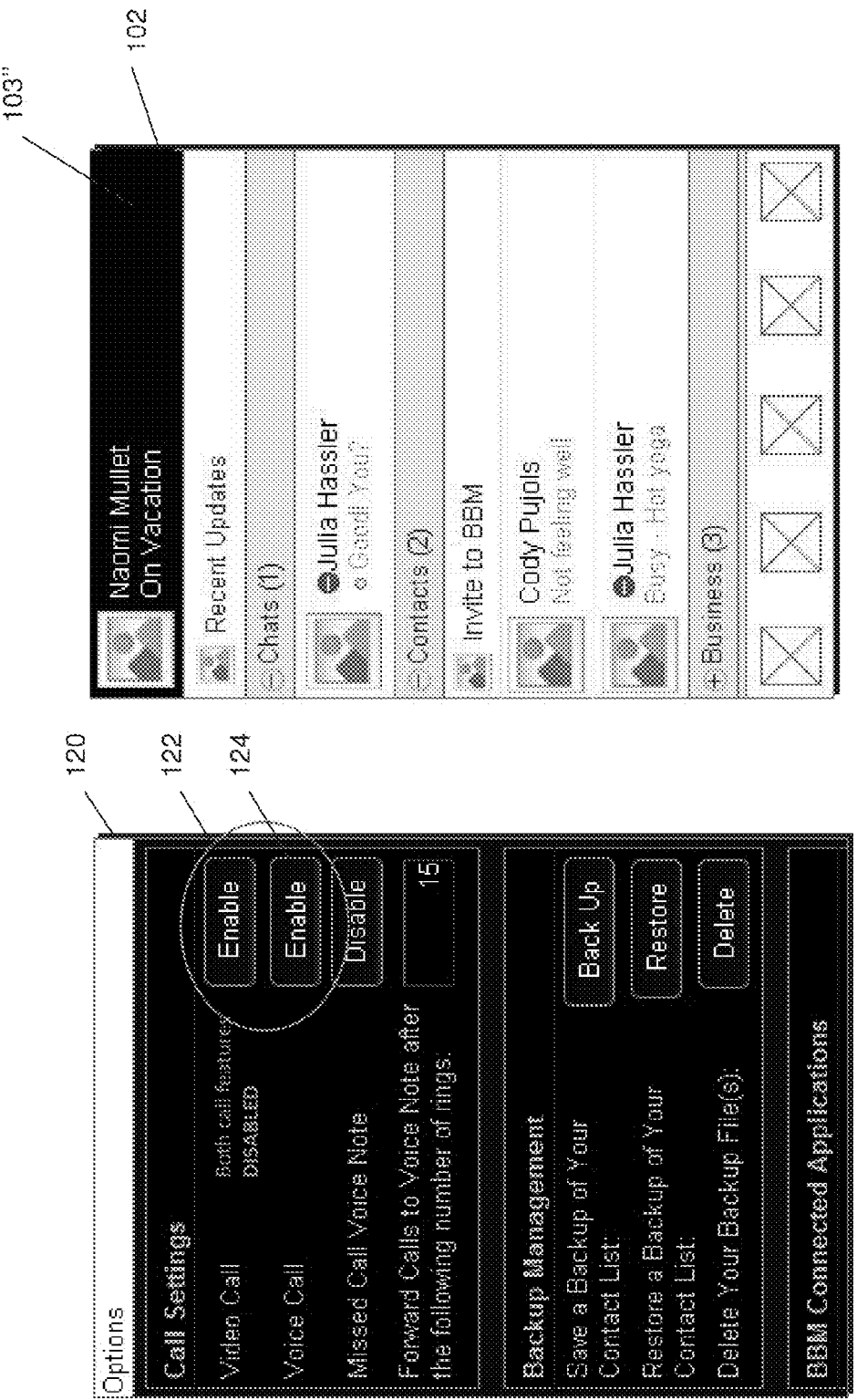

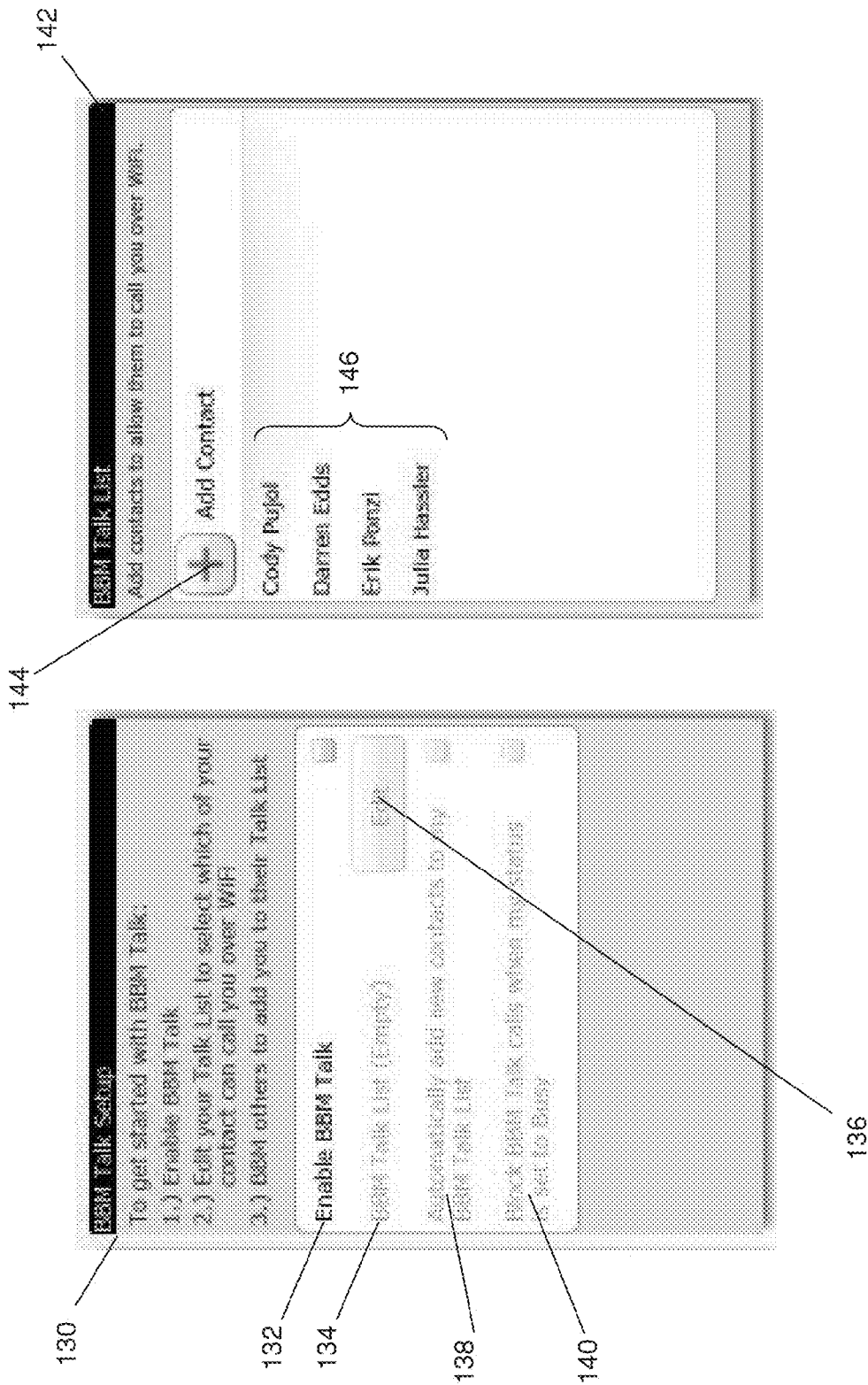

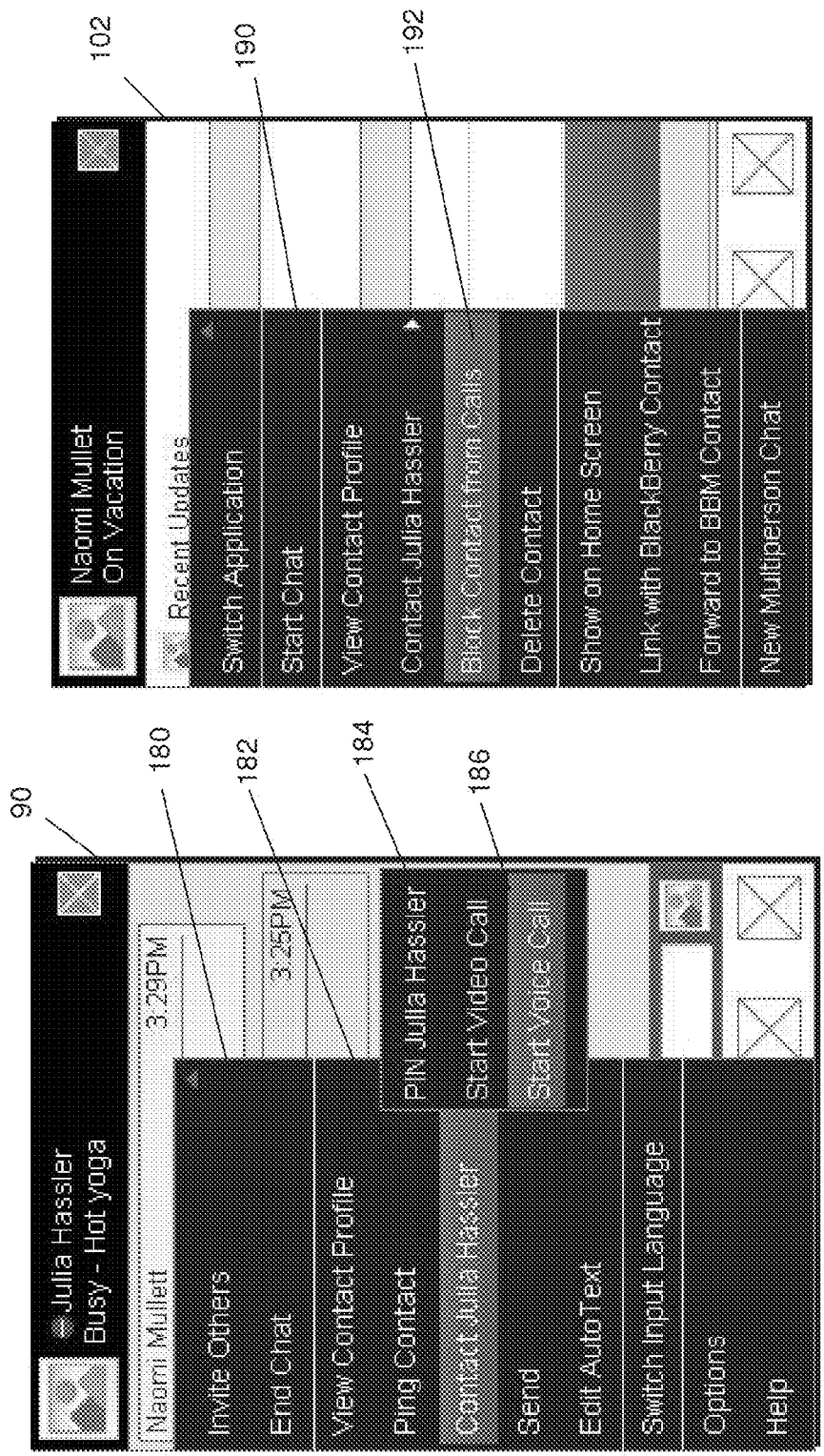

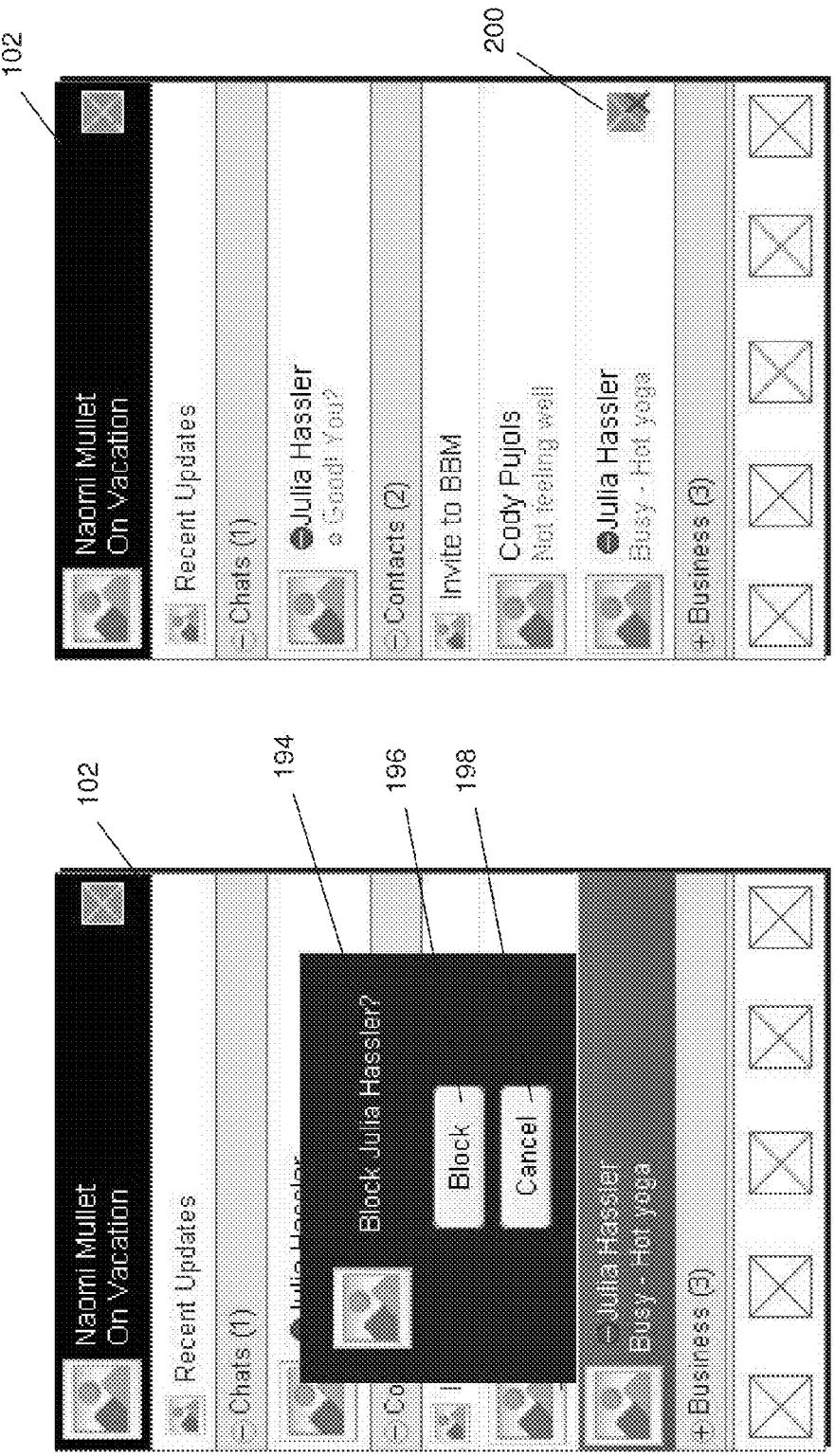

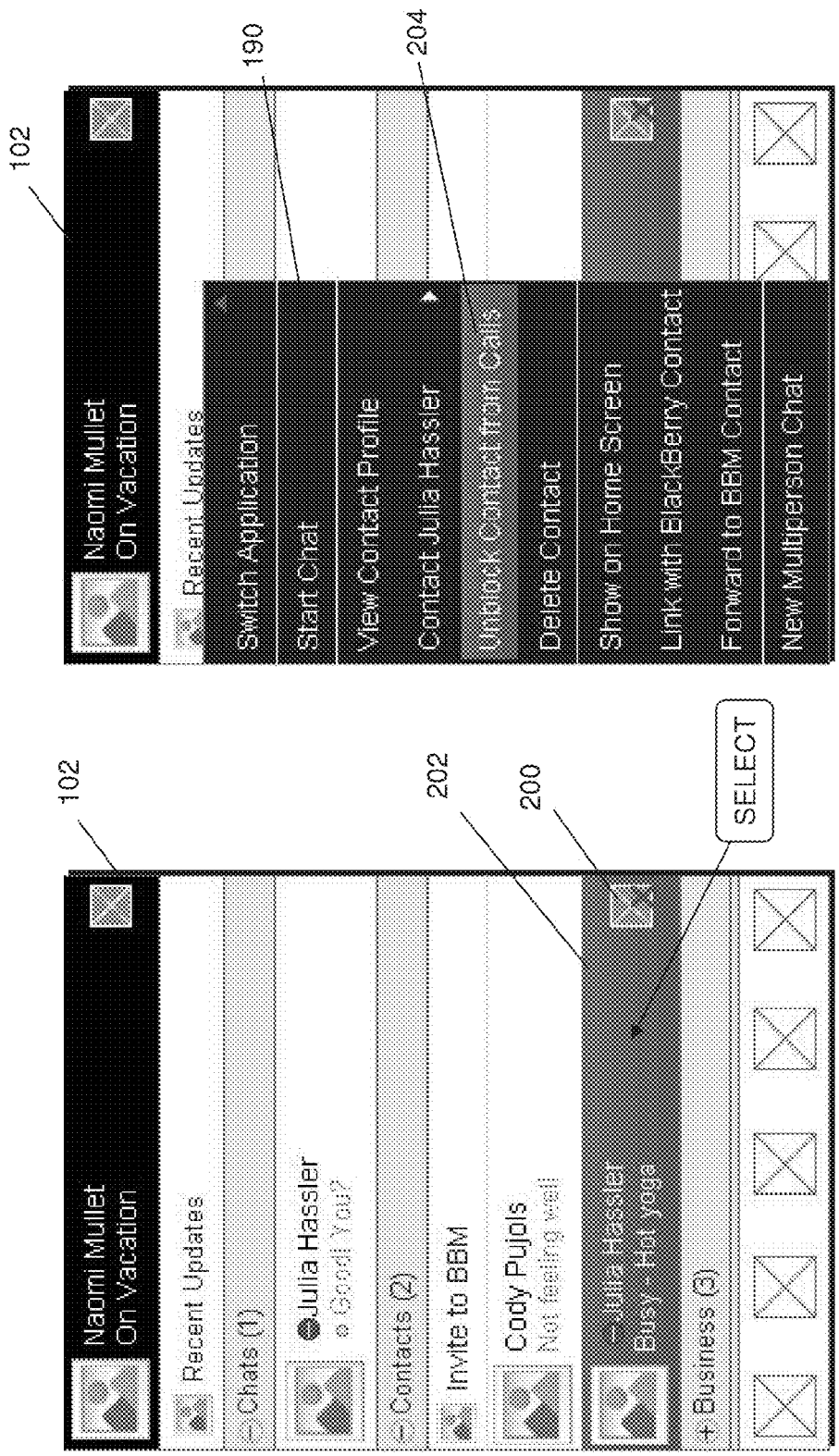

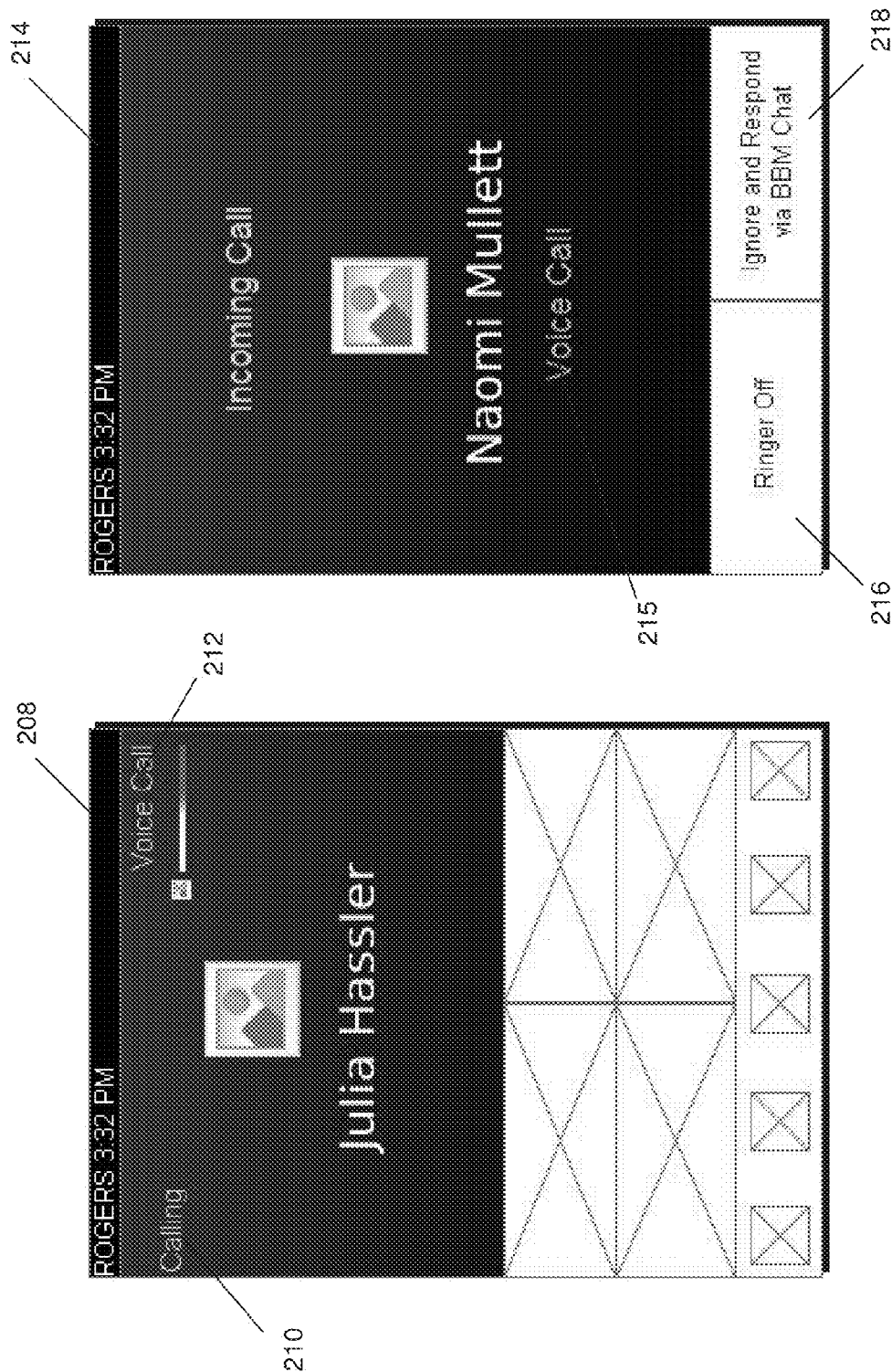

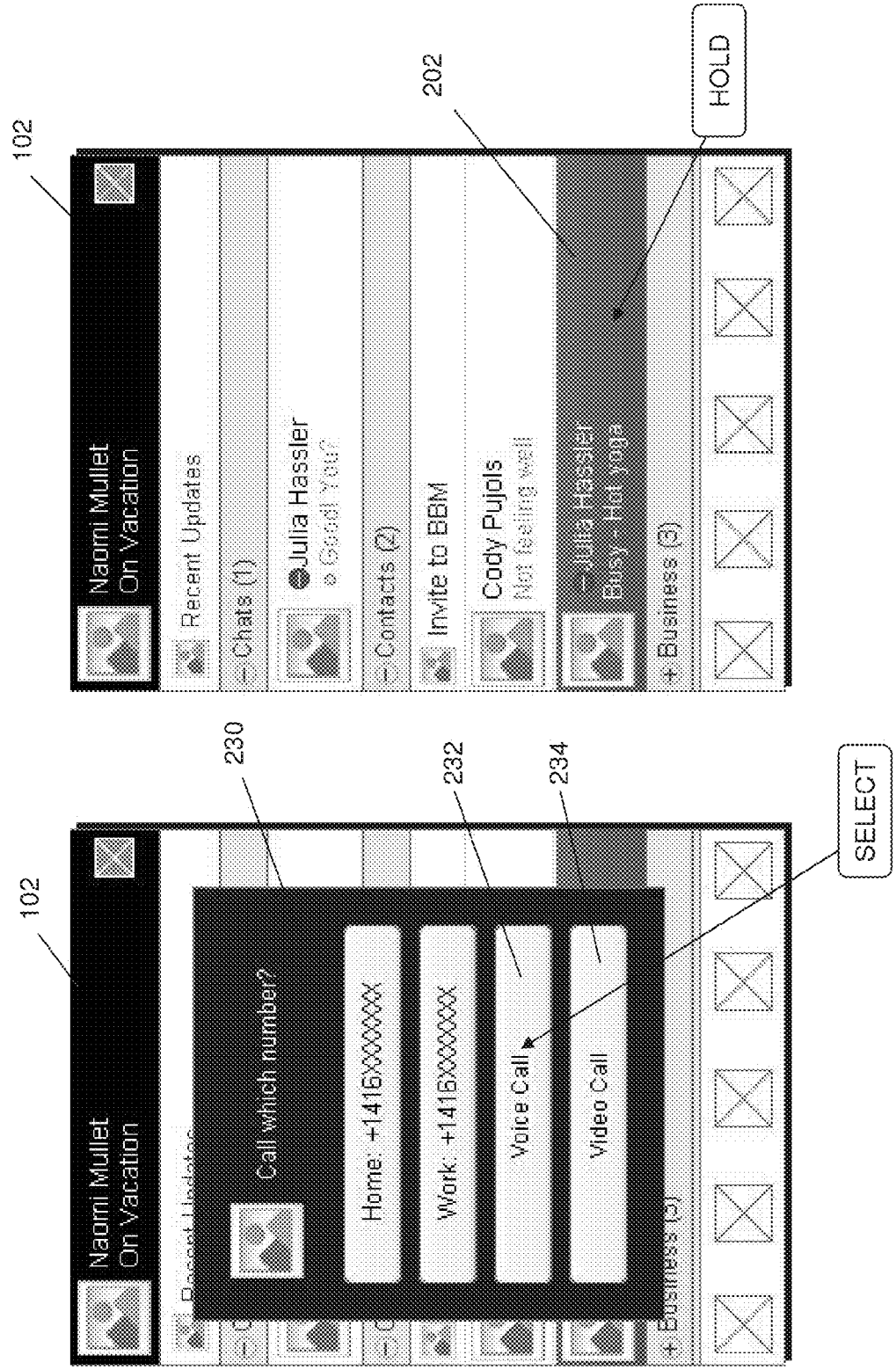

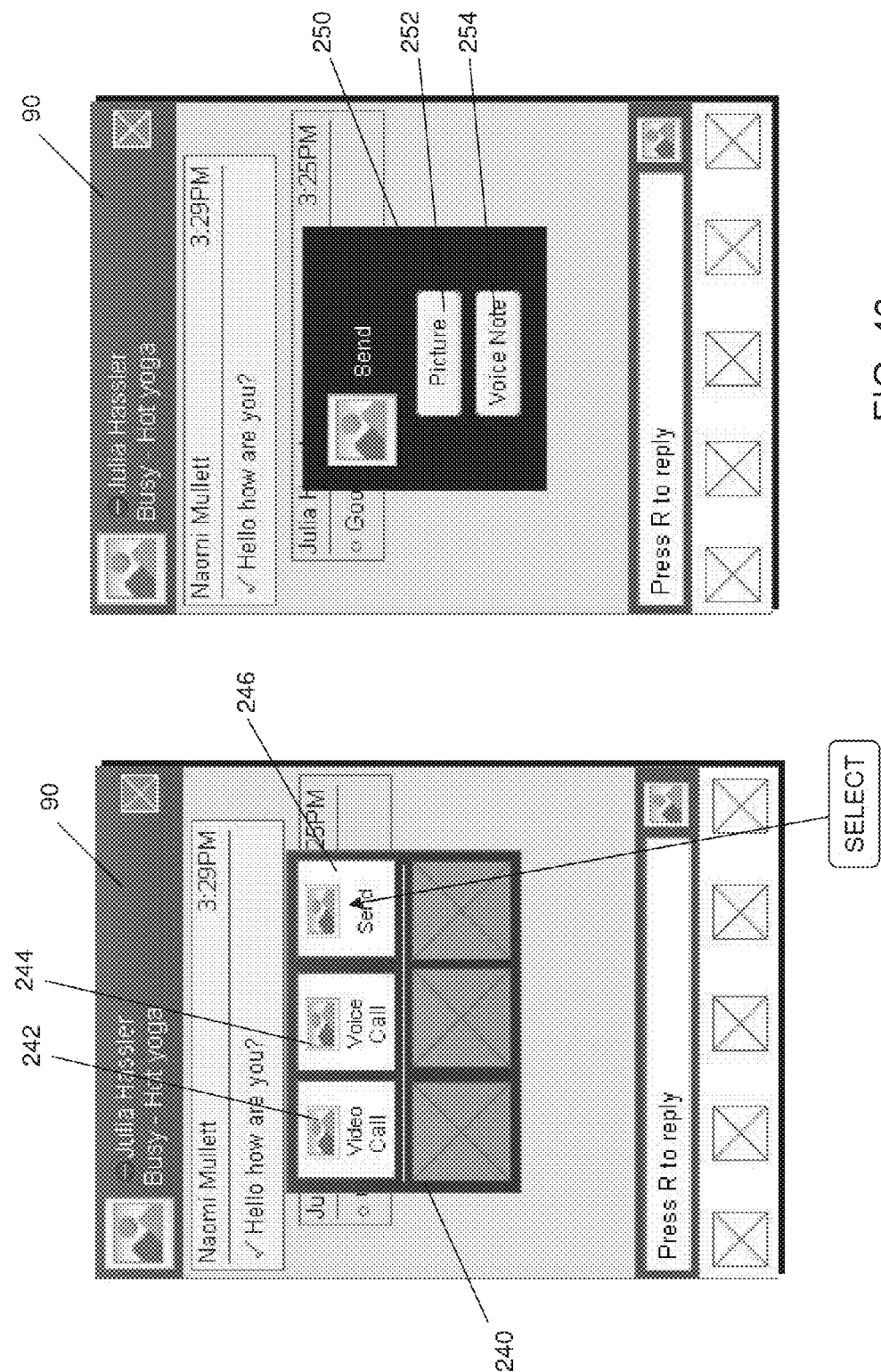

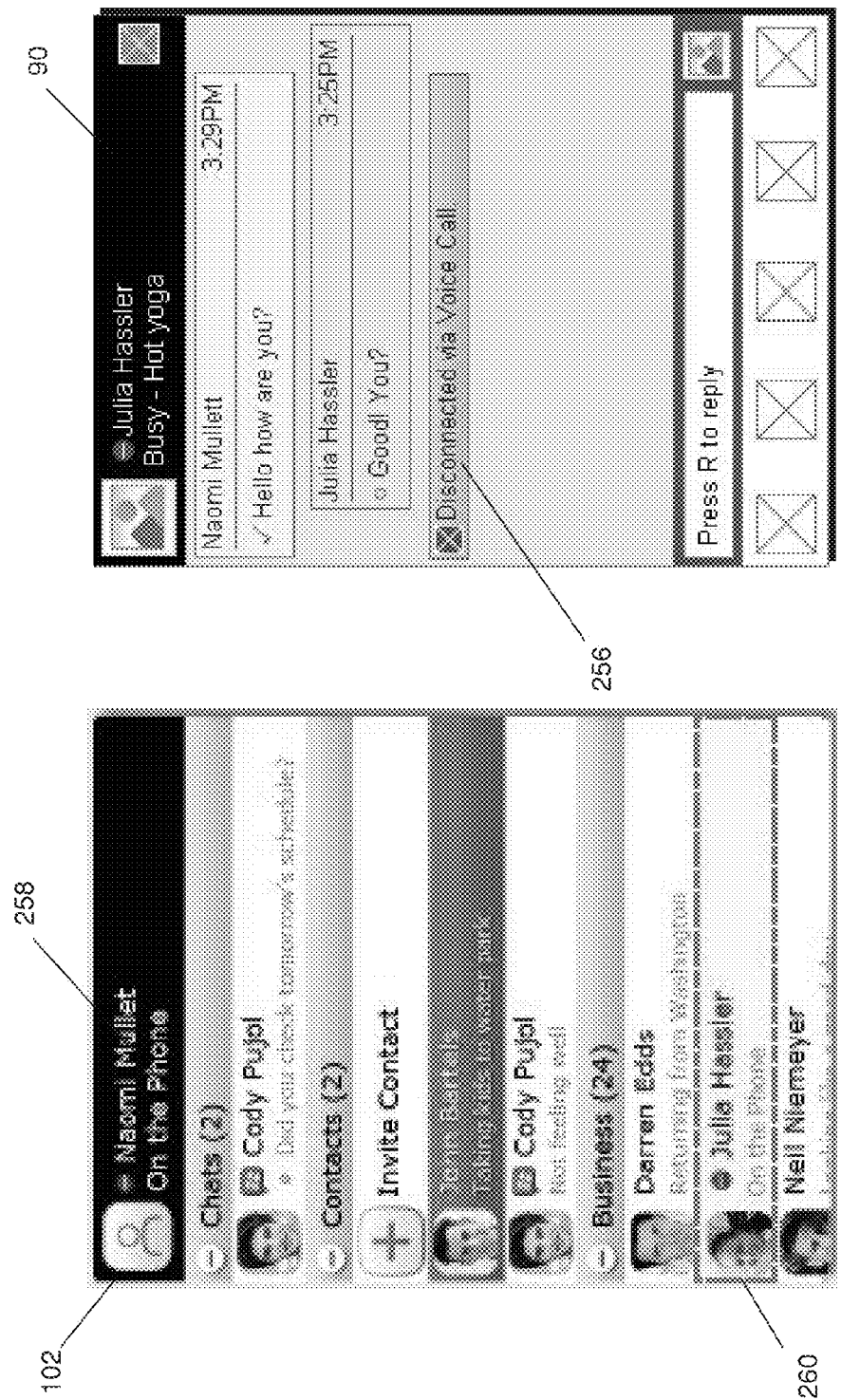

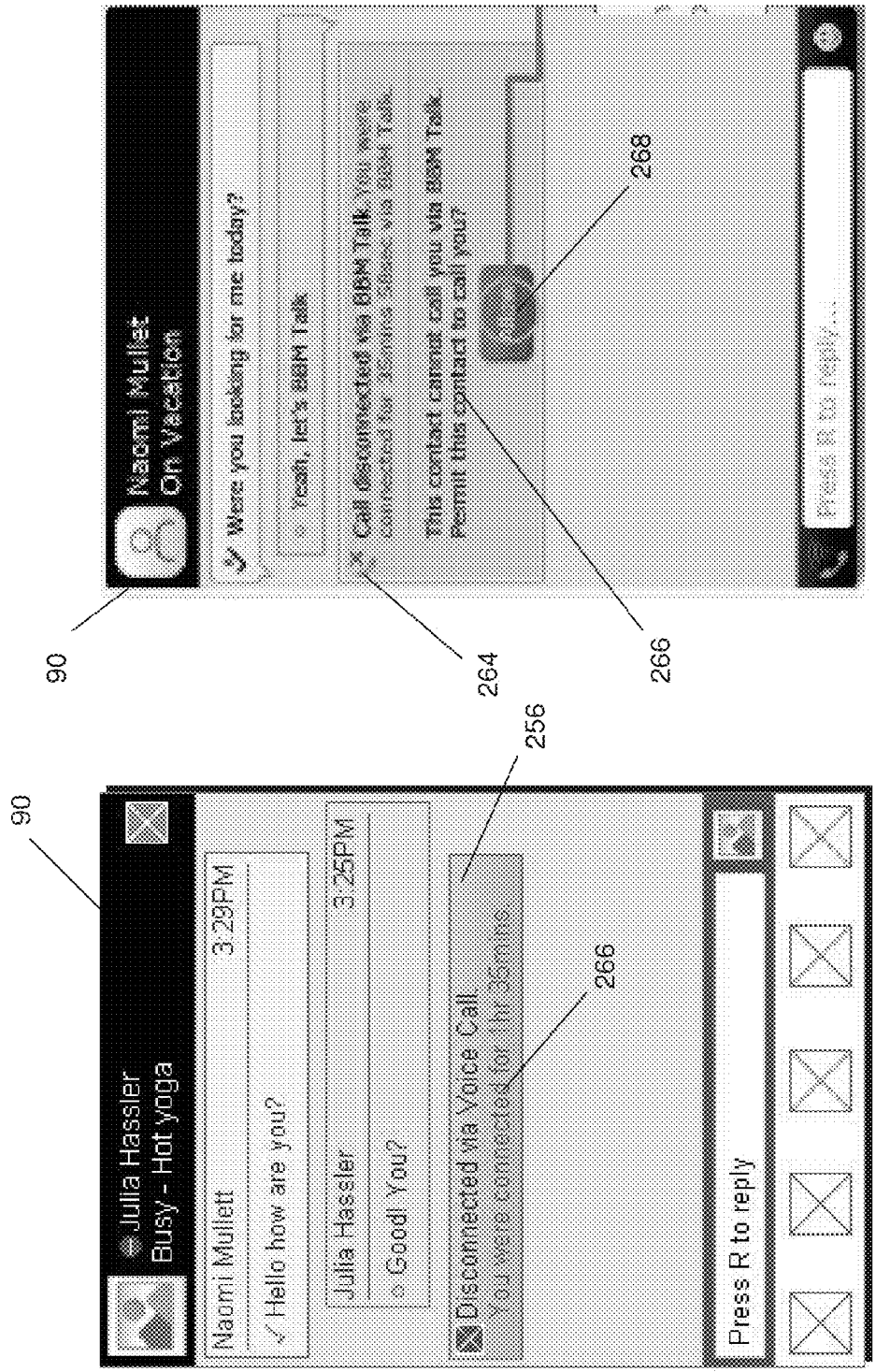

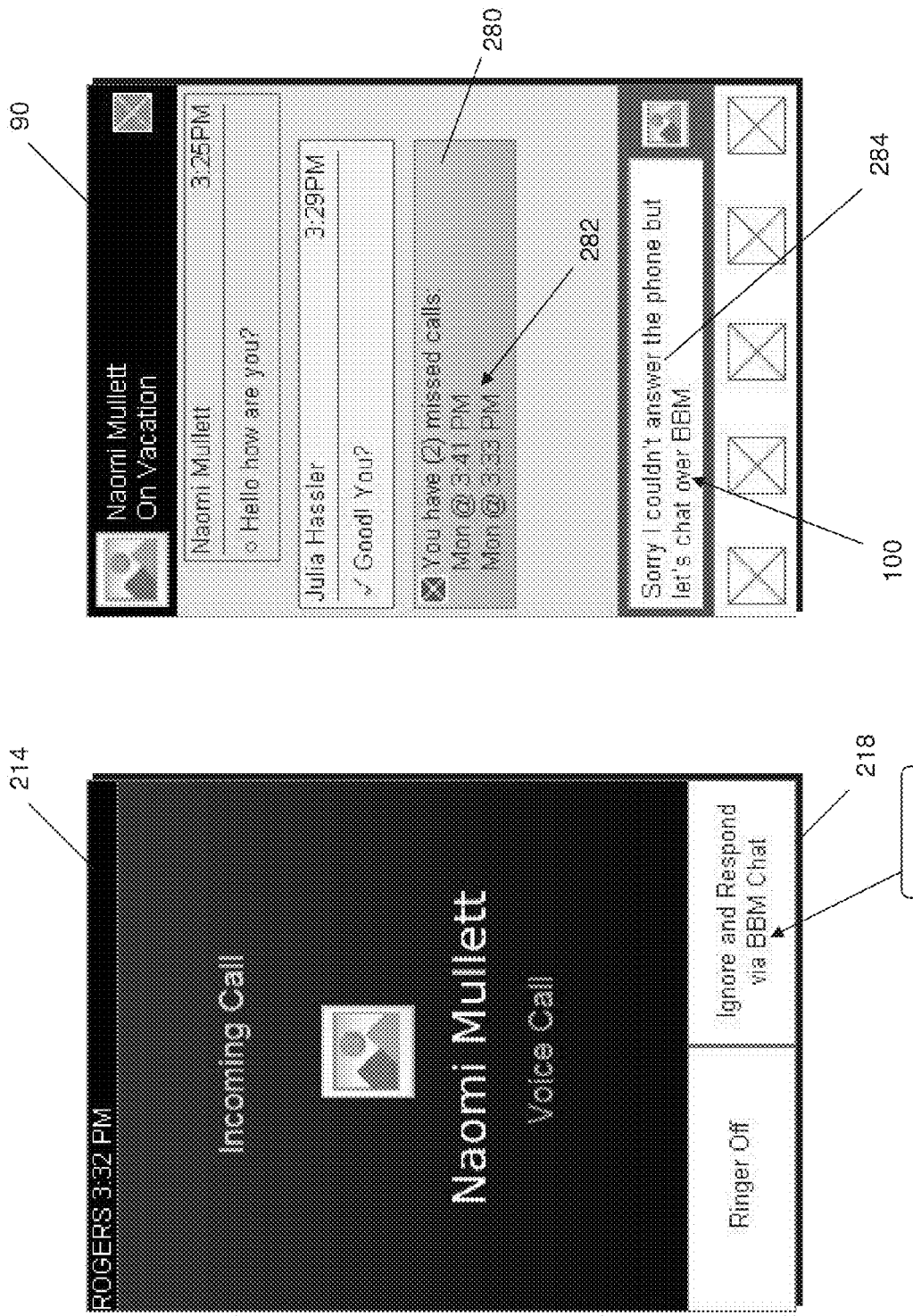

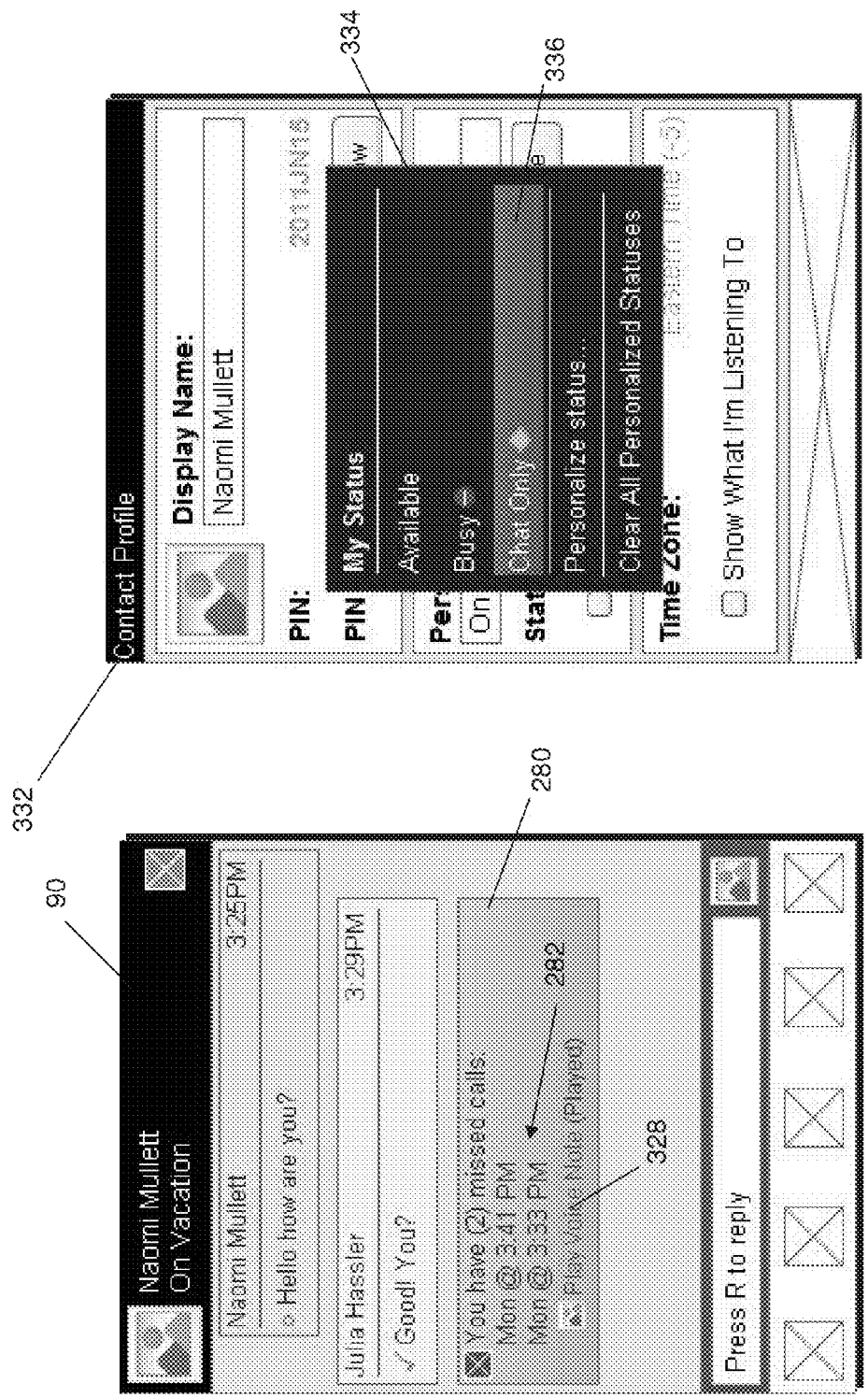

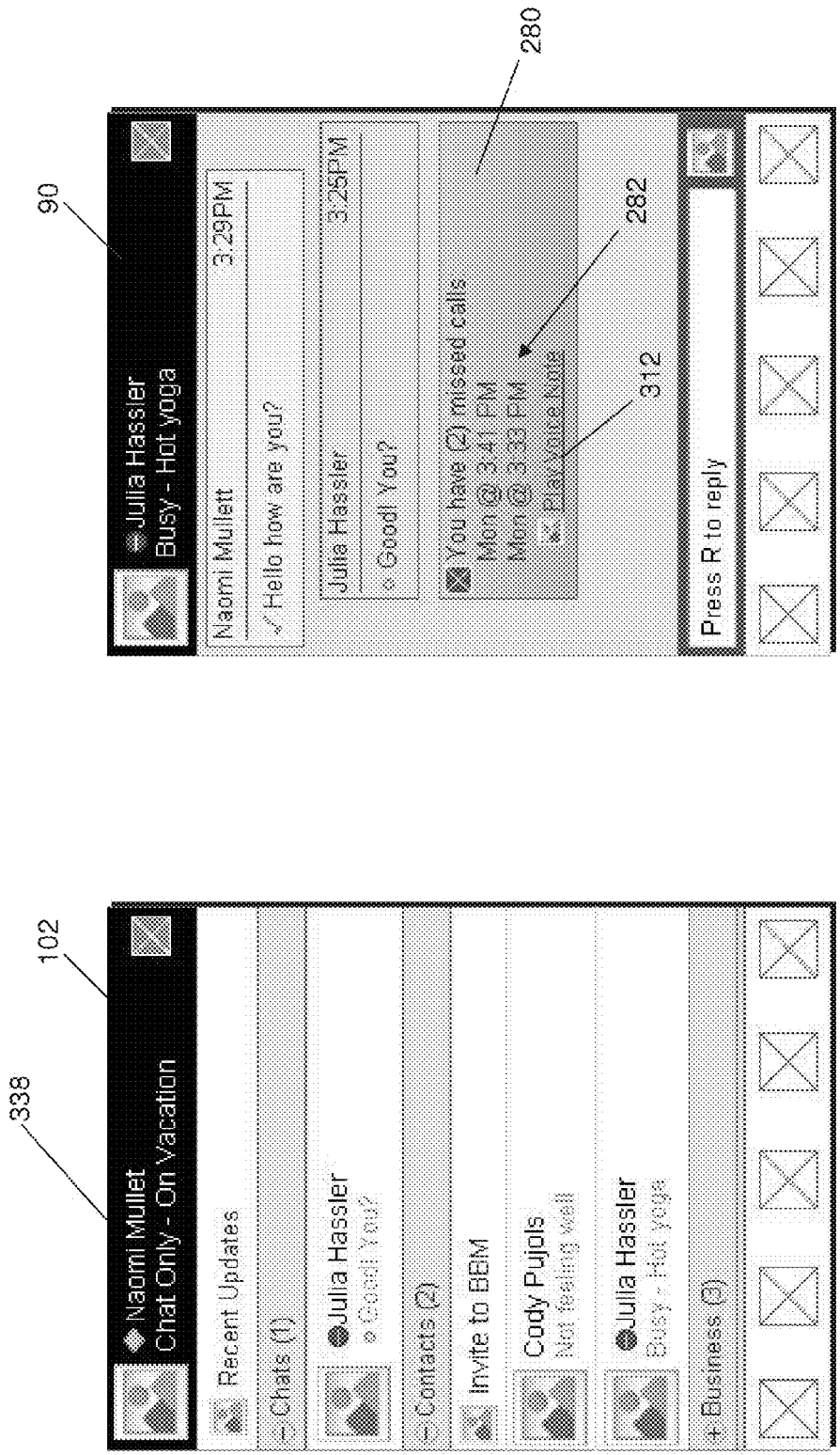

SYSTEM AND METHOD FOR ENABLING VOICE AND VIDEO COMMUNICATIONS USING A MESSAGING APPLICATION

This application claims priority from U.S. Provisional Patent Application No. 61/554,752 filed on Nov. 2, 2011, the entire contents of which are incorporated herein by reference.

TECHNICAL FIELD

The following relates to enabling voice and video communications using a messaging application.

DESCRIPTION OF THE RELATED ART

Mobile communication devices can be used to exchange messages and/or data. For example, data and/or messages can be exchanged between devices via email, instant messaging (IM), a short messaging service (SMS), file transfers using short and long range communication protocols, etc. Mobile communication devices are often also configured to provide cellular telephony services, voice and/or video communications over an internet connection (e.g., via Wi-Fi), or both.

While messages and data received from another device can be viewed and responded to at the user's convenience, voice and video communications, both cellular-based and internet-based, can be disruptive to the user.

BRIEF DESCRIPTION OF THE DRAWINGS

Embodiments will now be described by way of example only with reference to the appended drawings wherein:

FIG. 12 is an example of an IM list view UI and a menu of options;

FIG. 13 is an example of an IM options UI;

FIG. 14 is an example of an IM options UI;

FIG. 15 is an example of an IM list view UI illustrating removal of a feature icon after disablement of voice and video calling functionality;

FIG. 18 is an example of an IM talk setup UI;

FIG. 19 is an example of an IM talk contact list UI;

FIG. 24 is an example of an IM conversation UI and a menu of options including an option for contacting a contact associated with the IM conversation view;

FIG. 25 is an example of an IM list view UI and a menu of options including an option to block a contact from calling via an IM application;

FIG. 26 is an example of an IM list view UI and a call blocking confirmation prompt;

FIG. 27 is an example of an IM list view UI illustrating a contact that has been blocked from calling via the IM application;

FIG. 28 is an example of an IM list view UI illustrating a contact that has been blocked from calling via the IM application;

FIG. 29 is an example of an IM list view UI and a menu of options including an option to unblock a contact to enable calling via the IM application;

FIG. 32 is an example of a call UI;

FIG. 33 is an example of an incoming call UI;

FIG. 38 is an example of an IM list view UI and a call selection prompt;

FIG. 39 is an example of an IM list view UI;

FIG. 42 is an example of an IM conversation UI and a graphical menu that may be invoked therein;

FIG. 43 is an example of an IM conversation UI and a prompt for sending a picture or voice note;

FIG. 44 is an example of an IM list view UI;

FIG. 45 is an example of an IM conversation UI including a message indicated that a voice call has been disconnected;

FIG. 46 is an example of an IM conversation UI including a messaging indicating that a voice call has been disconnected and a duration of the call;

FIG. 47 is an example of an IM conversation UI showing a disconnected message, call details, and an option to permit a contact to connect via an IM voice channel;

FIG. 50 is an example of an incoming call UI;

FIG. 51 is an example of an IM conversation UI including a default or predefined message that may be sent subsequent to ignoring an incoming call;

FIG. 60 is an example of an IM conversation UI including a message indicating that a received voice note has been played;

FIG. 61 is an example of an IM contact profile UI showing a presence status selection menu;

FIG. 62 is an example of an IM list view UI showing a chat only presence status indicator;

FIG. 63 is an example of an IM conversation UI including a message with a link for playing a received voice note;

DETAILED DESCRIPTION

Figure 1:
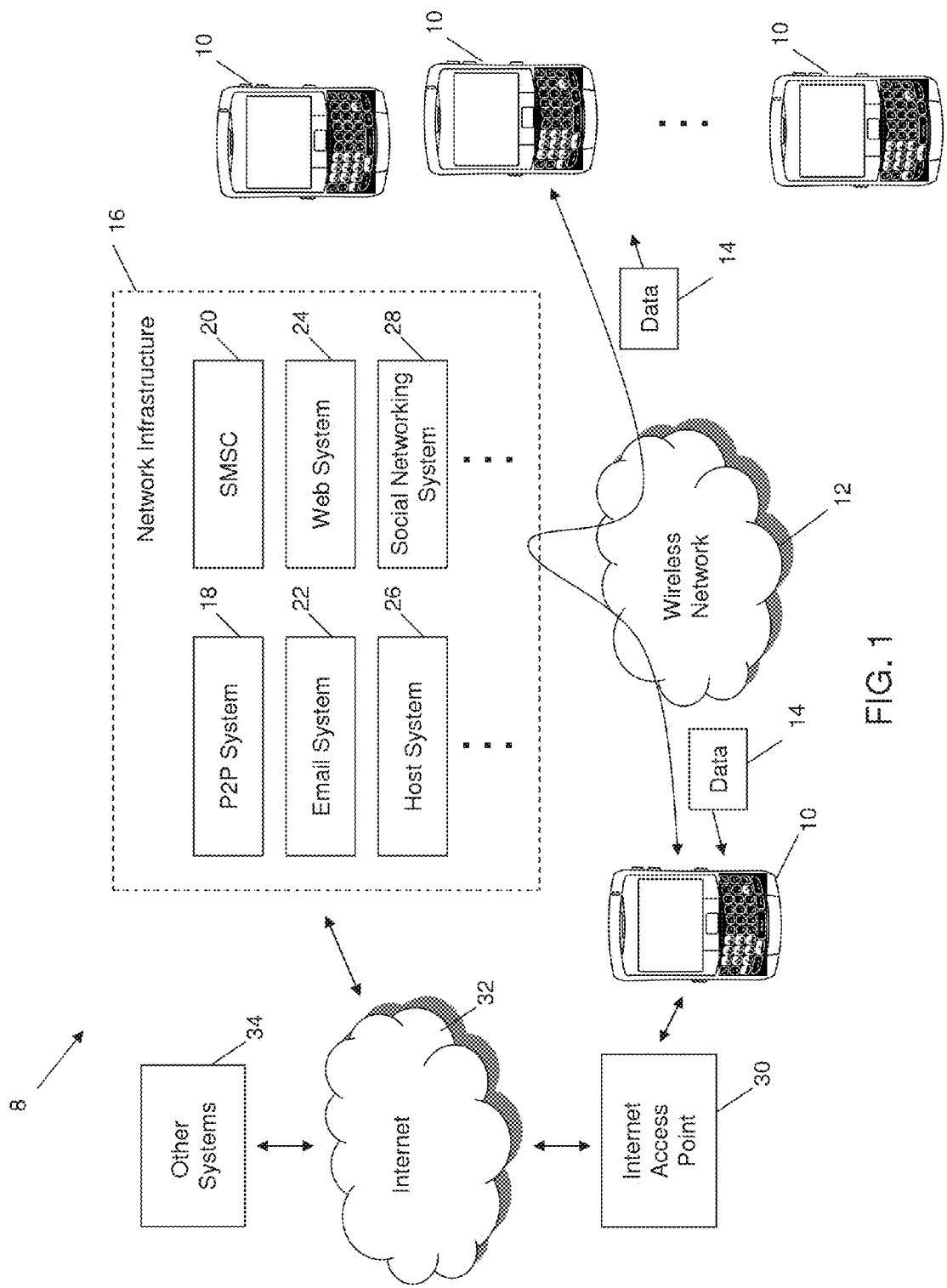
FIG. 1 is a block diagram of an example of a communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

It has been found that voice and/or video communications that are facilitated via a messaging service and application, such as IM, can utilize presence status settings to control the manner in which such communications are handled. For example, a presence status option can be provided to block voice and/or video communications when that presence status option has been selected, or one or more presences status options can cause the voice and/or video communications to be blocked, diverted, or otherwise suppressed while that/those presence status option(s) are in use. It can be appreciated that "presence" as discussed herein may refer to any status indicator that conveys the ability and/or willingness of a potential communication partner, e.g., a user, to communicate.

Turning to FIG. 1, an example of a communication system 8 is shown. The communication system 8, in this example, enables, at least in part, mobile devices 10 to communicate with each other via a wireless network 12. For example, as shown, data 14 may be exchanged between various mobile devices 10. Data 14 that is sent from one mobile device 10 to another mobile device 10 may be transmitted according to a particular messaging or communication medium, protocol, or other mechanism. For example, as shown in FIG. 1, data 14 may be sent over the wireless network 12 via a component of a network infrastructure 16. It can be appreciated that the network infrastructure 16 shown in FIG. 1 is illustrative only and any component shown within the dashed lines may also or instead be operated by or within another infrastructure or entity. In this example, the network infrastructure 16 includes various example systems that may be used by the mobile devices 10 to exchange data 14. The not exhaustive list of examples shown in FIG. 1 includes a peer-to-peer (P2P) system 18 (e.g. an IM system), an SMS centre (SMSC), an email system 22 (e.g. web-based, enterprise based, or otherwise), a web system 24 (e.g. hosting a website or web service), a host system 26 (e.g. enterprise server), and a social networking system 28.

The mobile devices 10 may therefore send data to or receive data from other mobile devices 10 via one of the example systems with which the mobile devices 10 are communicable via the wireless network 12 and network infrastructure 16. The mobile devices 10 may also communicate with other mobile devices 10, the network infrastructure 16, and various other systems 34 via the Internet 32 by communicating with, and obtaining access from, an Internet access point 30. For example, the mobile device 10 may include a Wi-Fi communication module 54 (see also FIGS. 3 and 4) that is operable to communicate with the Internet access point 30 over a short-range communication connection. It can be appreciated that, as illustrated in FIG. 1, the mobile device 10 may communicate with the various systems 18-28 of the network infrastructure 16 by accessing the Internet 32 as well as the wireless network 12.

Figure 3:
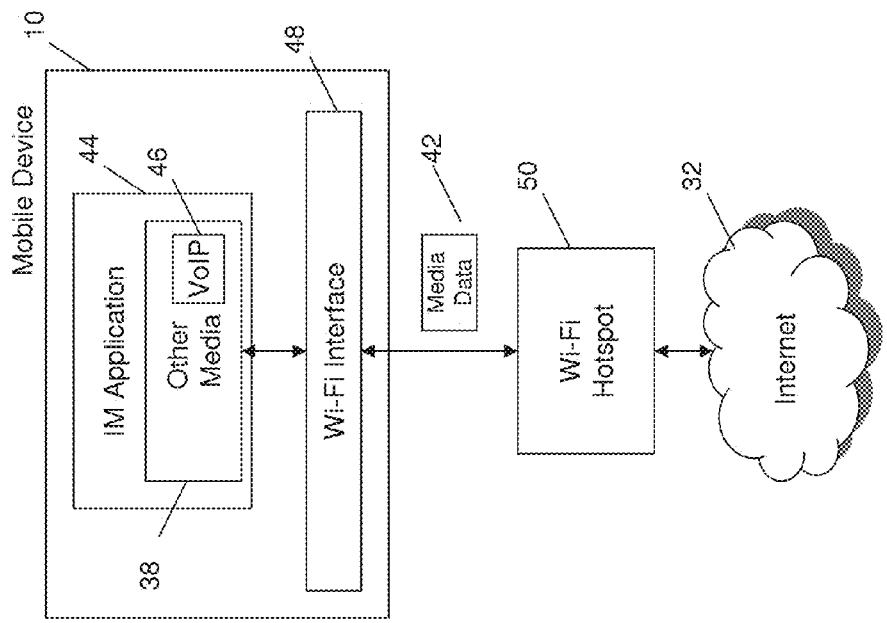
FIG. 3. is a block diagram of an example of a configuration for a mobile device.
Figure 2:
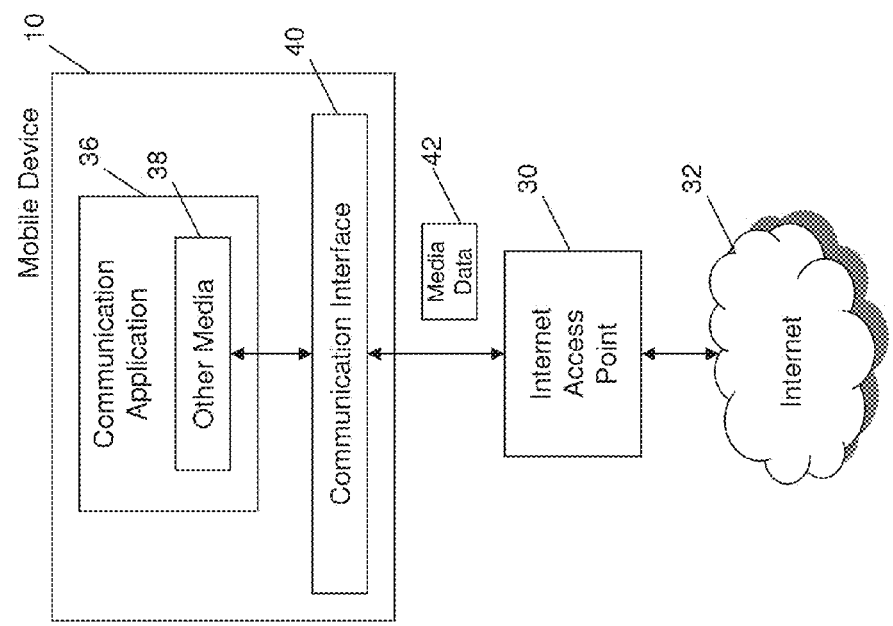
FIG. 2 is a block diagram of an example of a configuration for a mobile device.

A mobile device 10 including a communication application 36 is shown in FIG. 2. The communication application 36 includes an other media component 38 that is operable to send and receive voice and/or video, collectively referred to herein as "media data" 42 using a communication interface 40. The other media component 38 and the communication interface 40 in this example are configured to communicate with an Internet access point 30 to obtain access to the Internet 32 for exchanging the media data 42. FIG. 3 illustrates an example wherein the communication application 36 corresponds to, or at least includes, an IM application 44. In the example shown in FIG. 3, the other media component 38 corresponds to, or at least includes, voice over Internet Protocol (VoIP) functionality 46, and the communication interface 40 corresponds to, or at least includes, a Wi-Fi interface 48. In the example shown in FIG. 3 the media data 42 is exchanged by accessing a Wi-Fi configured access point, commonly referred to as a Wi-Fi "hotspot" 50.

Figure 4:
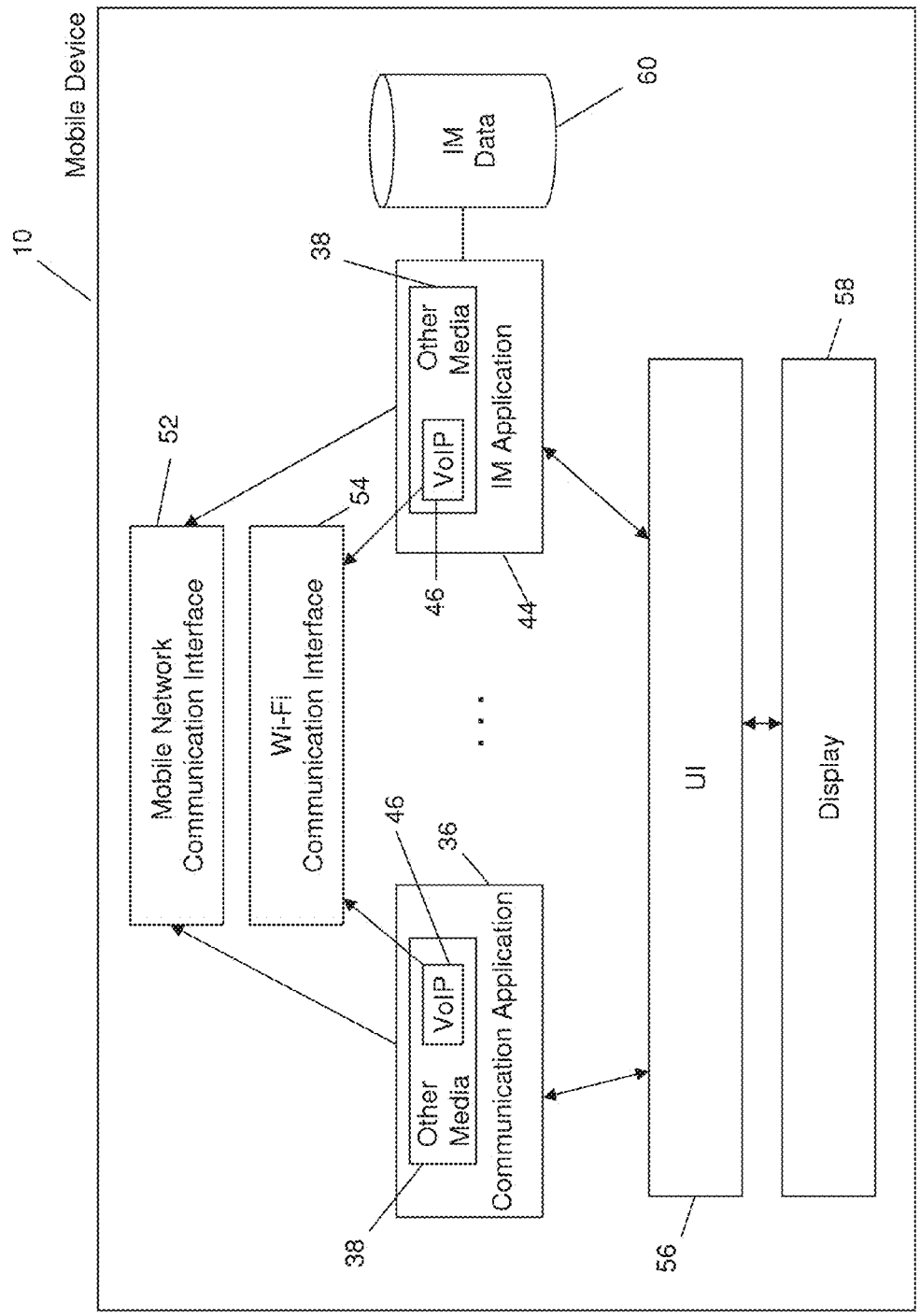
FIG. 4 is a block diagram of an example of a configuration for a mobile device.

An example of a configuration of a mobile device 10 is shown in FIG. 4. In the example shown in FIG. 4, the mobile device 10 includes both a mobile network communication interface 52 for accessing the wireless network 12; and a Wi-Fi communication interface 54 for accessing Wi-Fi hotspots 50, and in turn the Internet 32. Both a communication application 36 having an other media component 38 and VoIP functionality 46 and the IM application 44 having an other media component 38 with VoIP functionality 46 are shown to illustrate that various communication media may operate according to the principles discussed herein and such principles should not be limited to IM-based media. The IM application 44 includes or otherwise has access to IM data 60, which may include, for example, presence data, contact list data, profiles, conversation data (e.g. chat histories), etc. The communication application 36 and IM application 44 may communicate with a user interface (UI) component 56 for displaying various UI screens via a display component 58.

It can be appreciated that the VoIP functionality 46, and the Wi-Fi communication interface 54 are shown for illustrative purposes only and other Internet based voice components 38 (e.g., as shown in FIG. 2), and protocols may be used according to the principles discussed herein. Moreover, it can be appreciated that the delineations between "components" shown in FIGS. 2 through 4 and described herein are for illustrative purposes only and equivalent functionality may be programmed or otherwise incorporated into software and/or hardware features of the mobile device 10 in various other suitable configurations.

Figure 5:
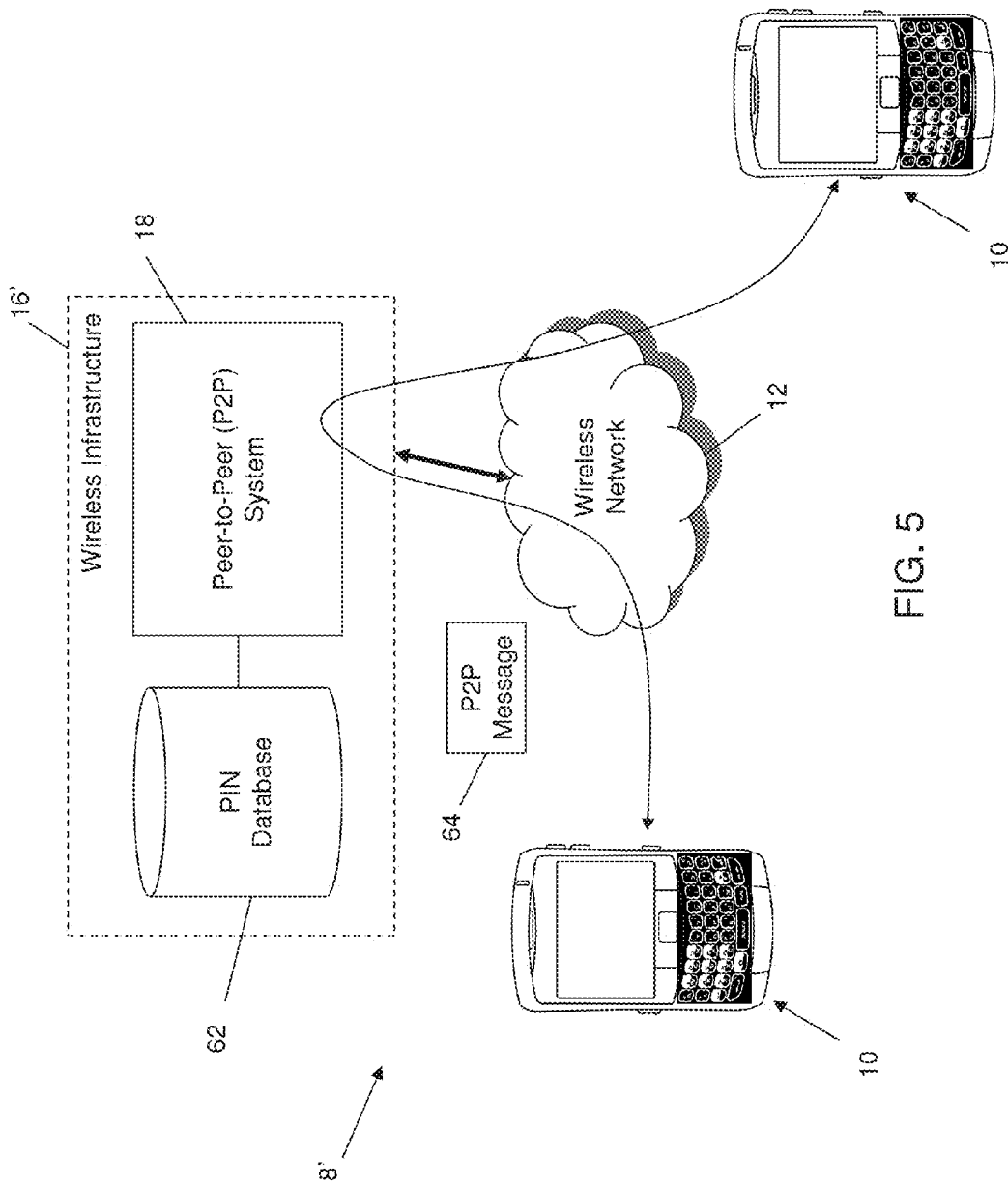
FIG. 5 is a block diagram of an example of a wireless communication system including a peer-to-peer (P2P) system.

As noted above, an example of a communication application 36 that can be configured to include the other media component 38 is an IM application 44. An example of a communication system 8' including a wireless infrastructure 16' that enables mobile devices 10 to communicate via a P2P messaging system 18 over the wireless network 12, is shown in FIG. 5. It will be appreciated that the mobile devices 10 shown in FIG. 5 are for illustrative purposes only and many other mobile devices 10 (not shown) may also be capable of communicating with or within the communication system 8'. It will also be appreciated that although the examples shown herein are directed to mobile communication devices, the same principles may apply to other devices capable of communicating with the P2P system 18. For example, an application (not shown) hosted by a desktop computer or other "non-portable" or "non-mobile" device may also be capable of communicating with other devices (e.g. including mobile devices 10) using the P2P system 18.

The P2P system 18 is, in this example, a component of the wireless infrastructure 16' associated with the wireless network 12. The wireless infrastructure 16' in this example includes, in addition to the P2P system 18, and among other things not shown for simplicity, a personal identification number (PIN) database 62. The PIN database 62 in this example embodiment is used to store one or more PINs associated with respective mobile devices 10, whether they are subscribers to a service provided by the wireless infrastructure 16' or otherwise.

A first mobile device 10 may communicate with a second mobile device 10 and vice versa via the P2P system 18, in order to perform P2P messaging or to otherwise exchange P2P-based communications. For ease of explanation, in the following examples, any P2P-based communication may also be referred to as a P2P message 64 as shown in FIG. 5. It can be appreciated that only two mobile devices 10 are shown in FIG. 5 for ease of illustration and, for example, in an electronic group conversation, three or more mobile devices 10 would be participating in the group conversation.

Figure 6:
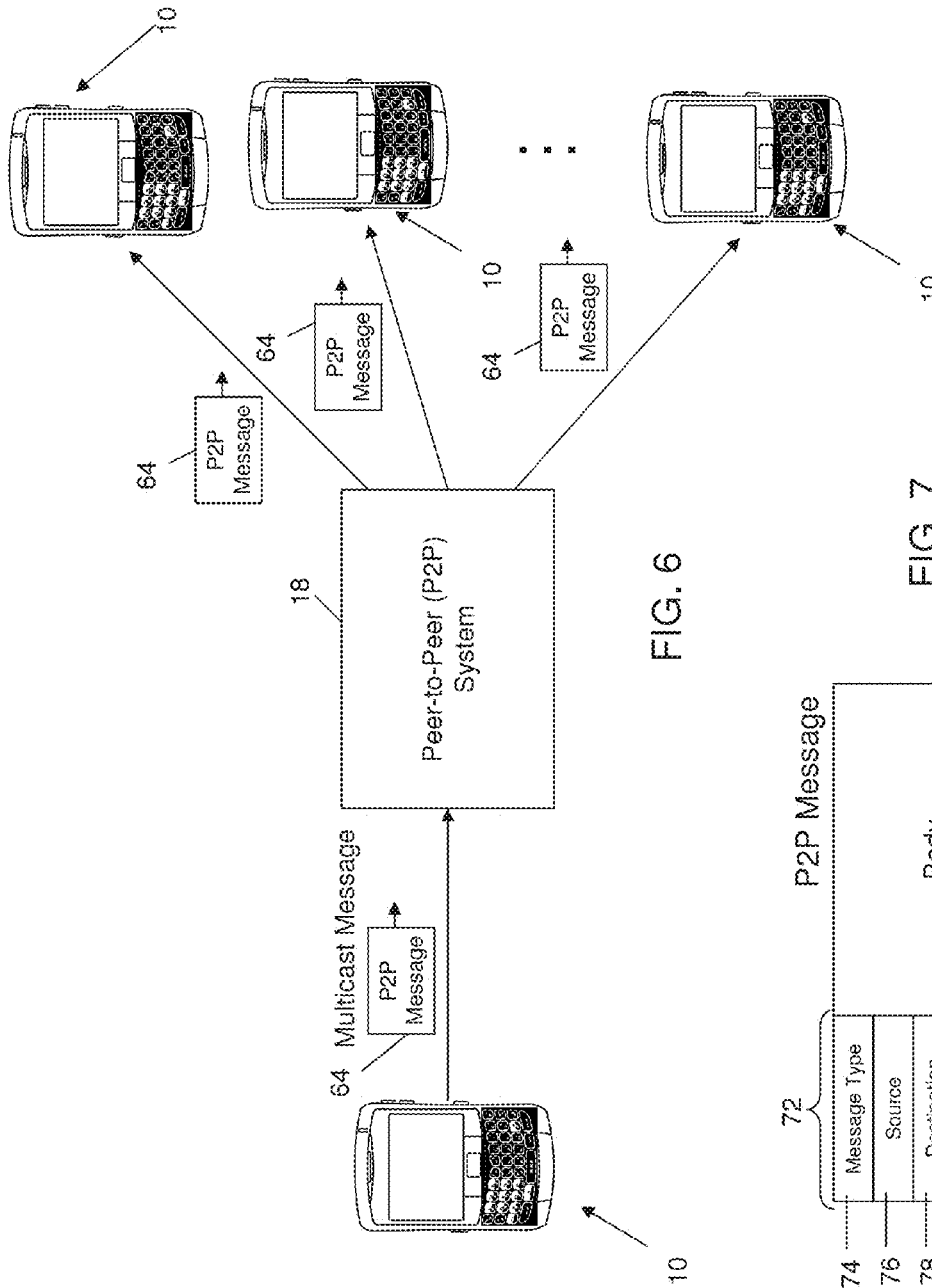
FIG. 6 is a block diagram of an example of a communication of a multi-cast P2P message via the P2P system of FIG. 2.

In some example embodiments, the P2P system 18 may be capable of sending multi-cast messages, i.e. forwarding a single message from a sender to multiple recipients without requiring multiple P2P messages 64 to be generated by such a sender. For example, as shown in FIG. 6, the P2P system 18 can be operable to enable a single P2P message 64 to be sent to multiple recipients by addressing the P2P message 64 to multiple corresponding P2P addresses, and having the P2P system 18 multicast the message 64 to those recipients.

Figure 7:
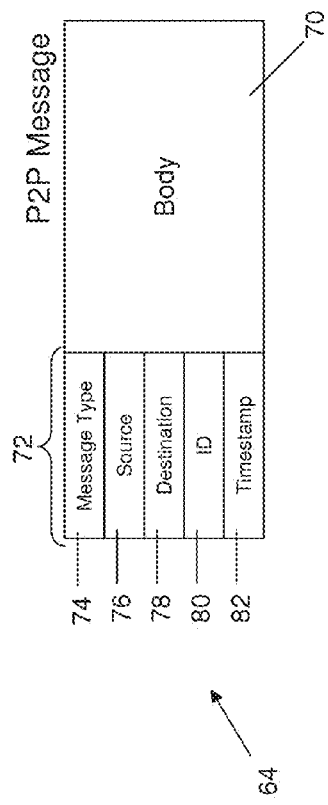
FIG. 7 is a block diagram illustrating an example of a P2P message.

An example of a P2P message 64 is shown in greater detail in FIG. 7, and has a format that is particularly suitable for a PIN-to-PIN based system. In a typical P2P protocol, each P2P message 64 has associated therewith a source corresponding to the mobile device 10 which has sent the P2P message 64 and includes a destination identifying the one or more intended recipients. Each P2P message 64 in this example includes a body 70, which contains the content for the P2P message 64 (e.g. text or other data), and a header 72, which contains various fields used for transmitting and processing each P2P message 64. In this example, the header 72 includes a message type field 74 to specify the type of transmission (e.g. chat, registration, block, presence, etc.), a source field 76 to specify the device address for the sender, a destination field 78 to specify the device address(es) for the one or more intended recipients, an ID field 80 to identify the corresponding P2P application (e.g., see IM application 44 in FIGS. 3 and 4) and a timestamp field 82 to indicate the time (and if desired, the date) at which the P2P message 64 was sent by the designated sender.

It can be appreciated that in this example, the ID field 80 can be used to specify the application ID to identify a P2P application on the mobile device 10. Where the P2P application relates to, for example, an IM system 18', the message type field 74 can also be used to designate an IM communication, and the ID field 80 would then correspond to a conversation ID, i.e. a conversation thread the message 64 corresponds to (e.g. such that each message 64 is identified by the conversation in which it was sent).

It will be appreciated that other information or attributes may be included in the P2P message 64, such as a subject field (not shown) to enable a subject for part or all of a conversation (in an IM example) to be transported with the P2P message 64 (e.g. to create new subjects, modify subjects, notify others of subjects, etc.), or application details field (not shown) to provide application-specific information such as the version and capabilities of the application.

The P2P system 18 can utilize any suitable P2P protocol operated by, for example, a P2P router (not shown), which may be part of the wireless infrastructure 16'. It can be appreciated however that a stand-alone P2P configuration (i.e. that does not rely on the wireless infrastructure 16'—not shown) may equally apply the principles herein. The P2P system 18 may also enable mobile devices 10 to communicate with desktop computers thus facilitating, for example, communications such as instant messaging (IM) between mobile applications and desktop applications on the desktop computer.

The P2P system 18 can be implemented using a router-based communication infrastructure, such as one that provides email, SMS, voice, Internet and other communications. Particularly suitable for hosting a P2P messaging router, is a wireless router or server used in systems such as those that provide push-based communication services. In FIG. 5, the wireless infrastructure 16' facilitates P2P communications such as instant messaging between mobile devices 10. P2P messaging, such as IMing, is provided by an associated application stored on each mobile device 10, e.g. an IM application 44 as shown in FIGS. 3 and 4, which can be initiated, for example, by highlighting and selecting an icon from a display as is well known in the art. The P2P system 18 routes messages between the mobile devices 10 according to the P2P protocol being used. For example, the P2P protocol may define a particular way in which to conduct IM or other types of messaging.

In general, in a P2P protocol, the sender of the P2P message 64 knows the source address of the intended recipient, e.g. a PIN. This may be established when the two devices request to add each other to their respective contact or buddy lists. A particular mobile device 10 can communicate directly with various other mobile devices 10 through the P2P system 18 without requiring a dedicated server for facilitating communications. In other words, the P2P system 18 enables the mobile devices 10 to communicate with each other directly over the wireless infrastructure 16' in accordance with the P2P protocol.

When conducting a P2P session according to the example shown in FIG. 5, the mobile devices 10 can communicate directly with the wireless infrastructure 16' in a client based exchange where, as noted above, an intermediate server is not required. A P2P message 64 sent by one mobile device 10 is received by the wireless infrastructure 16', which obtains the source address for the intended recipient (or recipients) from information associated with the message 64 (e.g. a data log) or from the message 64 itself. After obtaining the recipient's address according to the P2P protocol, the wireless infrastructure 16' then routes the message 64 to the recipient associated with the mobile device 10 having such address (or recipients having respective addresses). The wireless infrastructure 16' typically also provides a delivery confirmation to the original sender, which may or may not be displayed to the user. The destination device can also provide such delivery information. The wireless infrastructure 16' may be capable of routing P2P messages 64 reliably as well as being capable of holding onto the P2P messages 64 until they are successfully delivered. Alternatively, if delivery cannot be made after a certain timeout period, the wireless infrastructure 16' may provide a response indicating a failed delivery. The wireless infrastructure 16' may choose to expire a message 64 if a certain waiting period lapses.

Figure 8:
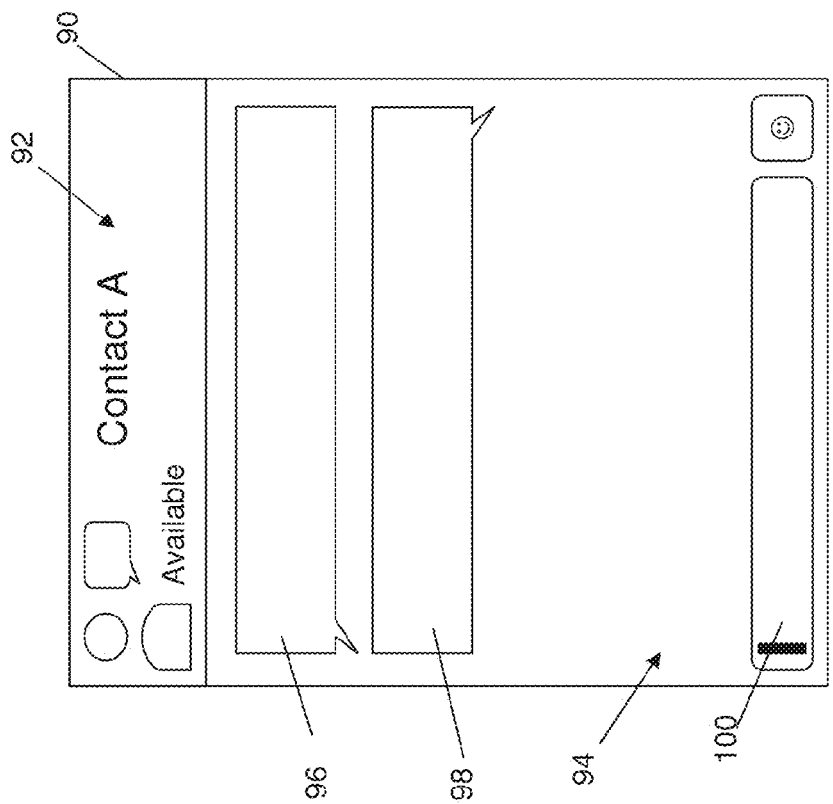
FIG. 8 is an example of an instant messaging (IM) conversation user interface (UI)

Referring now to FIG. 8, an example of an IM conversation UI 90 is shown. The IM conversation UI 90 in this example includes a banner portion 92, which may provide identifying information and presence information associated with one or more contacts with which the user of the mobile device 10 is communicating; a conversation portion 94, and a message composition portion 100. The conversation portion 94 in this example includes an outgoing message 96 that has been sent to Contact A, and an incoming message 98 that has been received from Contact A.

Figure 66:
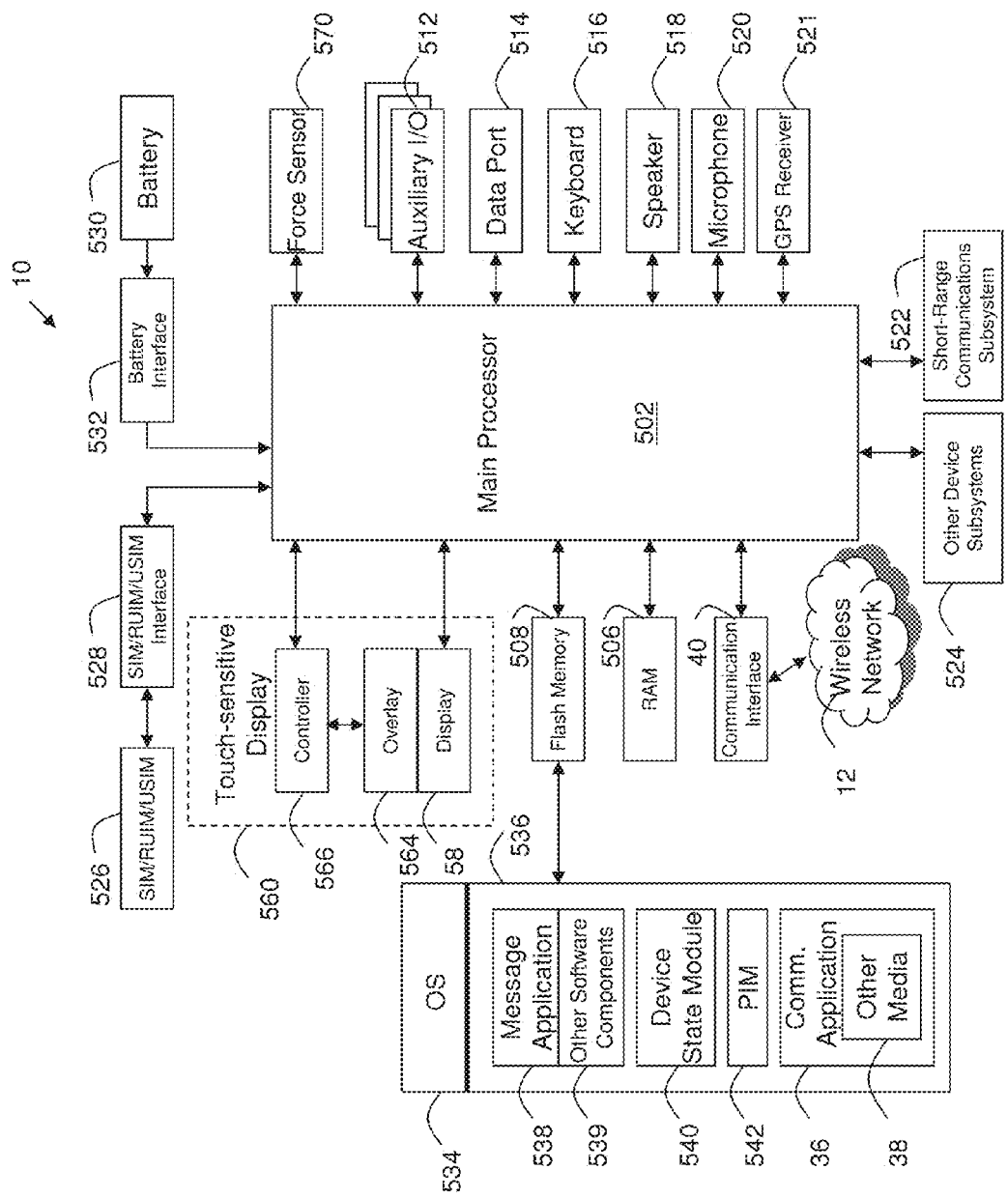
FIG. 66 is a block diagram of an example of a configuration for a mobile device.

A user of mobile device 10 interacts with IM conversation UI 90 through input and output mechanisms of mobile device 10 (as shown in FIG. 66). For example, a user may select a portion of IM conversation UI by actuating a particular button of mobile device 10 or by touching a particular area of a touch sensitive display of mobile device 10. Mobile device 10 detects or otherwise recognizes such input and performs actions based on the specific input. Such interactions are well known in the art.

Figure 9:
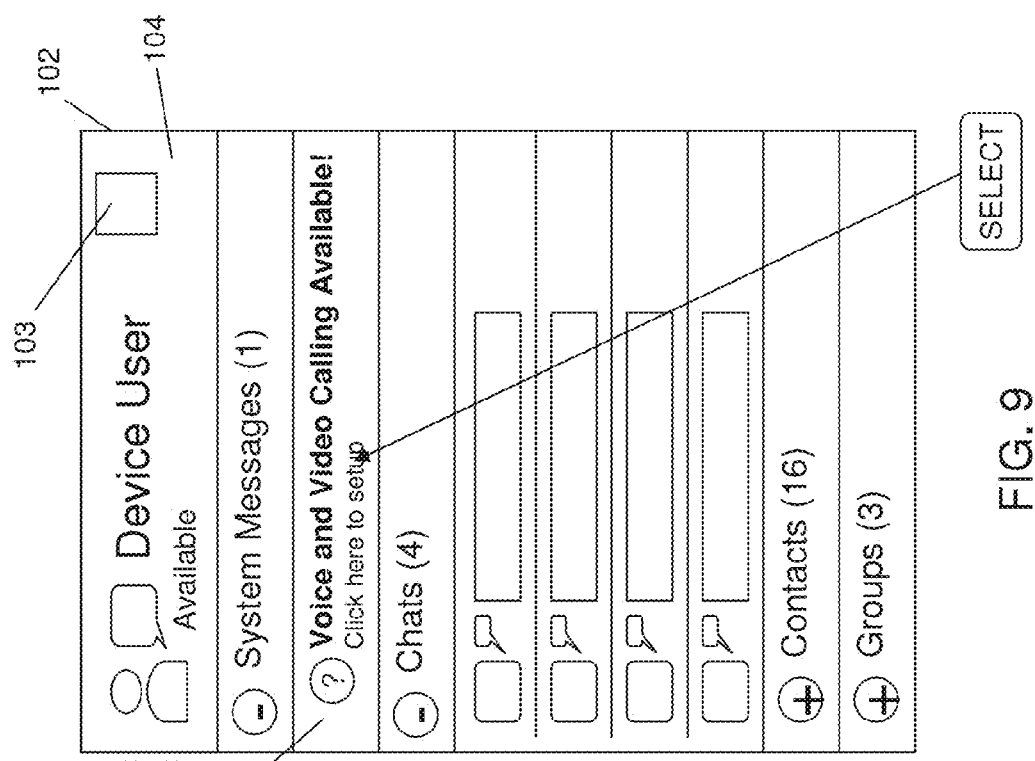
FIG. 9 is an example of an IM list view UI.
Figure 11:
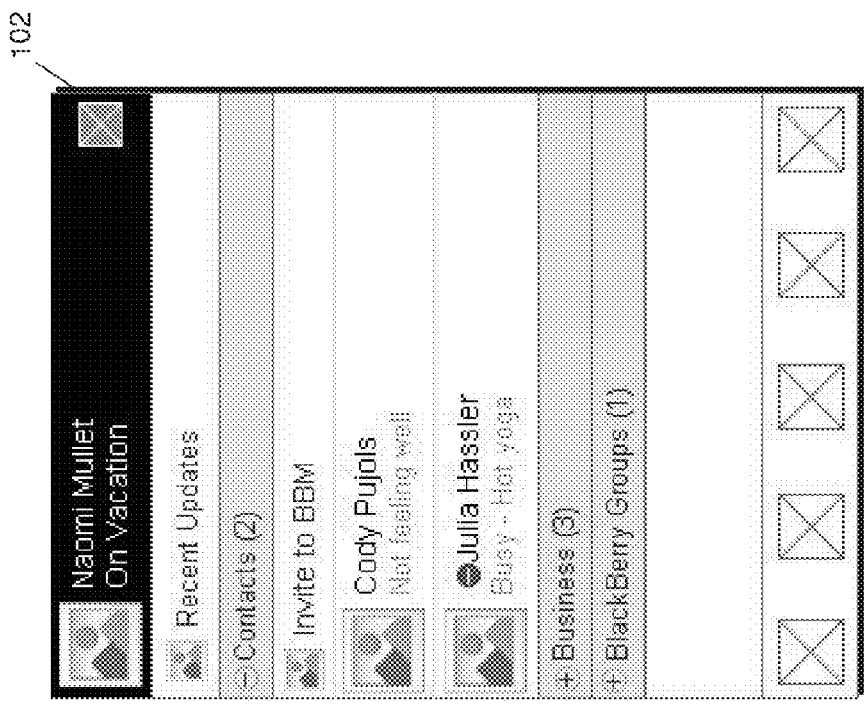
FIG. 11 is an example of an IM list view UI illustrating removal of a system message associated with voice and video call functionality.
Figure 10:
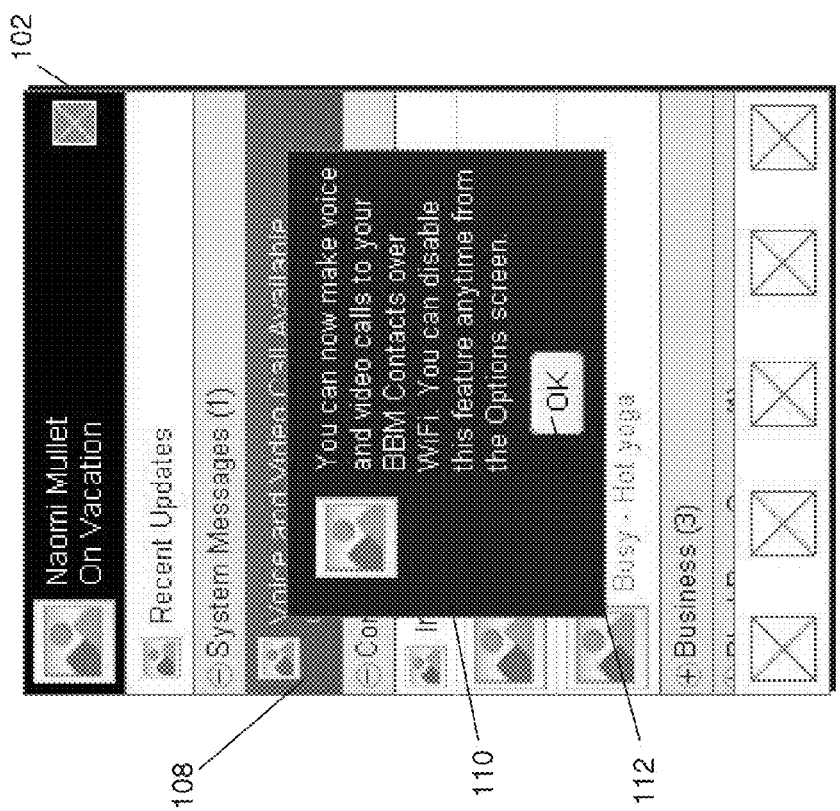
FIG. 10 is an example of an IM list view UI and a voice and video call notification.

FIG. 9 illustrates an example of an IM list view UI 102. The IM list view UI 102 includes a banner portion 104, which provides identifying information and presence information associated with the user of the mobile device 10. The banner portion 104 in the example shown in FIG. 9 also includes a media feature icon 103, which may be used to indicate which of video and/or voice functionality has/have been enabled within the IM environment. The IM list view UI 102 in this example also includes a list portion 106, which includes, among other things, a system message list entry 108 that indicates that an IM voice and video calling service is available to be used from within the IM application 44. By selecting the system message list entry 108 as shown in FIG. 9, a system notification 110 may be displayed as shown in FIG. 10. By selecting an OK button 112 in the notification 110, the system message list entry 108 is removed as shown in FIG. 11 and the other media component 38 initiated or otherwise activated for subsequent use. As indicated in the system notification 110, the "other media" functionality (e.g., voice and/or video calling) can be selectively enabled and disabled by accessing an options UI 120, as shown in FIG. 13. FIG. 12 illustrates a menu 114 that may be invoked from the IM list view UI 102. The menu 114 may include an options entry 116, which may be selected to invoke the options UI 120 shown in FIG. 13.

Figures 16, 17:
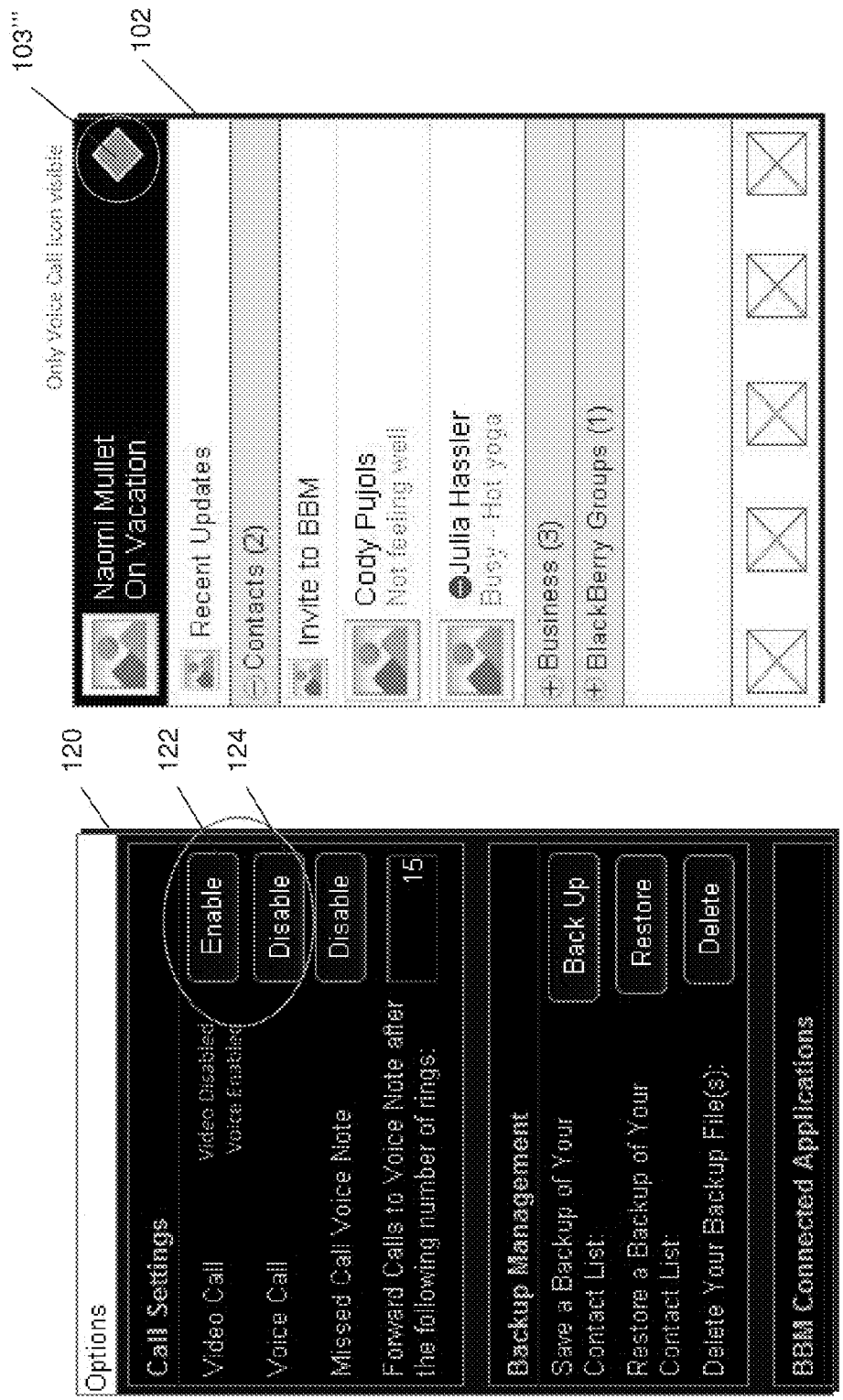
FIG. 16 is an example of an IM options UI.
FIG. 17 is an example of an IM list view UI illustrating display of a voice calling icon after enablement of voice calling functionality.

The options UI 120 includes a call settings portion 121, which provides a video call button 122 for enabling and disabling video calling, and a voice call button 124 for enabling and disabling voice calling. The call settings portion 121 also includes a voice note button 126 for enabling and disabling an option to generate voice notes for missed calls, and a voice notes entry box 128 for enabling the user to specify after how many rings to forward calls to a voice note. In FIG. 13, both video and voice calling are enabled, and it can be appreciated that a first version 103' of the feature icon 103 may be displayed as shown in FIG. 12 to indicate the enabled features. FIG. 14 illustrates an example wherein both video and voice calling are disabled (i.e. both the video call button 122 and voice call button 124 have been selected to disable the respective features). When both video and voice calling have been disabled, a second version 103" of the feature icon 103 may be displayed as shown in FIG. 15, which in the example shown removes the feature icon 103 altogether. It can be appreciated that the second version 103" may instead include the feature icon 103 with an appropriate marking to indicate disablement rather than removing the feature icon 103 as illustrated. FIG. 16 illustrates an example wherein video calling has been disabled while voice calling has been enabled. As shown in FIG. 17, a third version 103''' of the feature icon 103 may be displayed that indicates that only voice calling is enabled. It can be appreciated that a fourth version (not shown) of the feature icon 103 may also be displayed when only video calling is enabled.

It can be appreciated that although both video and voice functionality are shown and described herein, in other examples, one or the other may be provided. For example, an IM voice set-up UI 130 may be displayed after selecting the system message list entry 108, as shown in FIG. 18. It can be appreciated that the IM voice set-up UI 130 can be accessed in various other ways, for example, a voice option may be selected, which invokes the IM voice set-up UI 130. The IM voice set-up UI 130 shown in FIG. 18 includes an enable option 132, a talk list option 134 having an associated edit button 136, an automatic addition option 138, and a block calls option 140. The enable option 132 is selected in order to allow voice-based media data 42 to be exchanged using the VoIP functionality 46, and once selected, provides access to the other options (i.e. those "grayed out" in FIG. 18) in the IM voice set-up UI 130. The automatic addition option 138 can be selected to have any new contacts in the IM application 44 added to a list of approved contacts for participating in a voice communication using the VoIP functionality 46. The block calls option 140 can be selected to control incoming voice communications to the VoIP functionality 46 according to a presence status. The block calls option 140 enables voice data 42 to be controlled in accordance with an automatically designated or selected IM presence status and thus minimize disruptions to the user when they are unavailable or otherwise do not wish to participate in a conversation, both message-based and voice-based. In this example, when the presence status is set to "Busy", the user does not receive any VoIP calls. As will be discussed in greater detail below, any missed calls may be identified using IM messages in an IM conversation.

Figure 20:
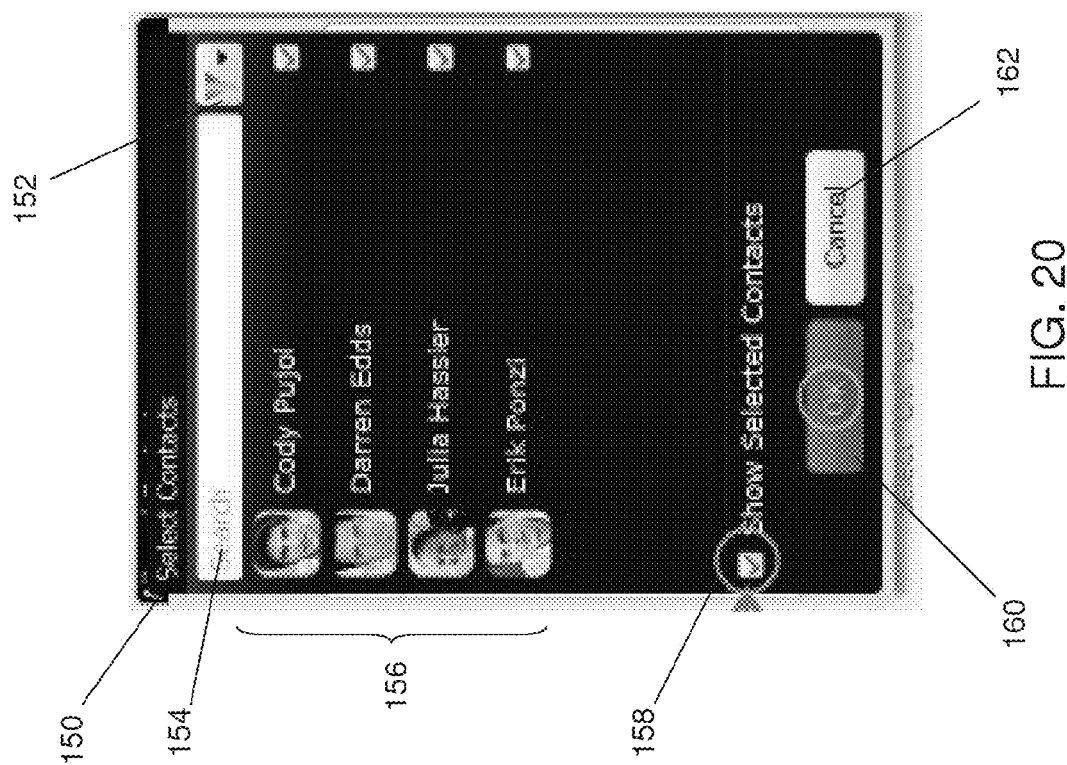
FIG. 20 is an example of an IM contact list selection UI.

By selecting the enable option 132, and then the edit button 136, an IM voice contact list UI 142 may be displayed as shown in FIG. 19. The IM voice contact list UI 142 includes an add contact button 144, and a list 146 of currently added contacts. The contacts in the list 146 are those contacts which the user has approved for participating in VoIP calls. List 146 provides a graphical representation of relationship data that is stored in a memory of mobile device 10. In one example, the relationship data is part of contact information associated with contacts and is stored in a contact data store, wherein the relationship data indicates whether an associated contact has been approved for participating in VoIP calls or not. Contacts are added and removed from list 146, and have their associated relationship data or contact entry updated by extension, using a variety of mechanisms, as described below. In one embodiment, contacts may be added to the list 146 by selecting the add contact button 144, which results in the display of an IM contact list selection UI 150 as shown in FIG. 20. It can be appreciated that contacts may be added and removed from the list 146 using various other mechanisms such as selecting options from a menu (not shown).

It can also be appreciated that a UI similar to that shown in FIG. 19 may also be provided for a blocked callers list. A blocked callers list enables relationships for additional contacts to be updated to reflect additional contacts not approved to participate in VoIP calls causing entries to be graphically added to a list of blocked callers. Selecting a particular contact in the list can also initiate a process to remove a contact from the blocked callers list and thus change the relationship data thereafter enabling participation in calls using the IM application 44.

The IM contact list selection UI 150 shown in FIG. 20 includes a search bar 154 for entering a search query, a filter button 152, a list of contact results 156 (which may include all contacts), a show selections check box 158, an OK button 160, and a cancel button 162. The filter button 152 can be used to enable selection of a particular category of contacts, such as friends, family, business/work, etc. Each contact in the list of contact results 156, has associated therewith, a check box. By selecting the show selections check box 158, a filter may be applied that removes unselected contacts from the list thereby reducing the number of entries in the list 156 that a user would need to review before selecting the OK button 160. By selecting one or more of the contacts in the list of contact results 156, selecting the show selections check box 158, and selecting the OK button 160, the selected contacts are added to the list 146 shown in FIG. 19.

Figure 21:
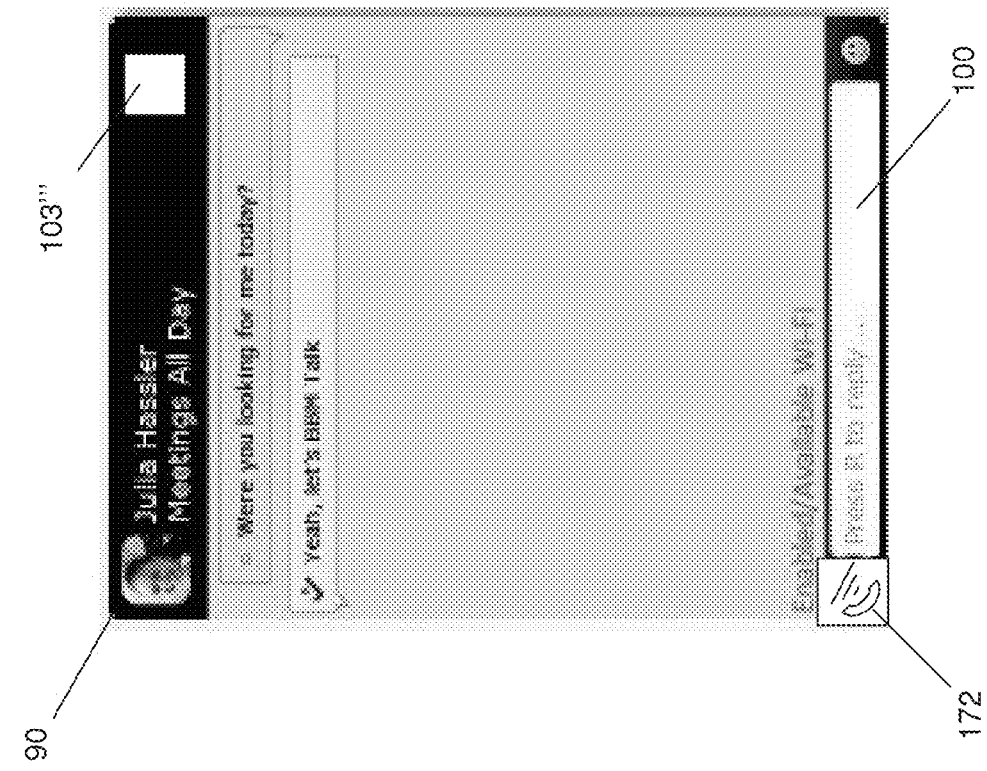
FIG. 21 is an example of an IM conversation UI.
Figure 23:
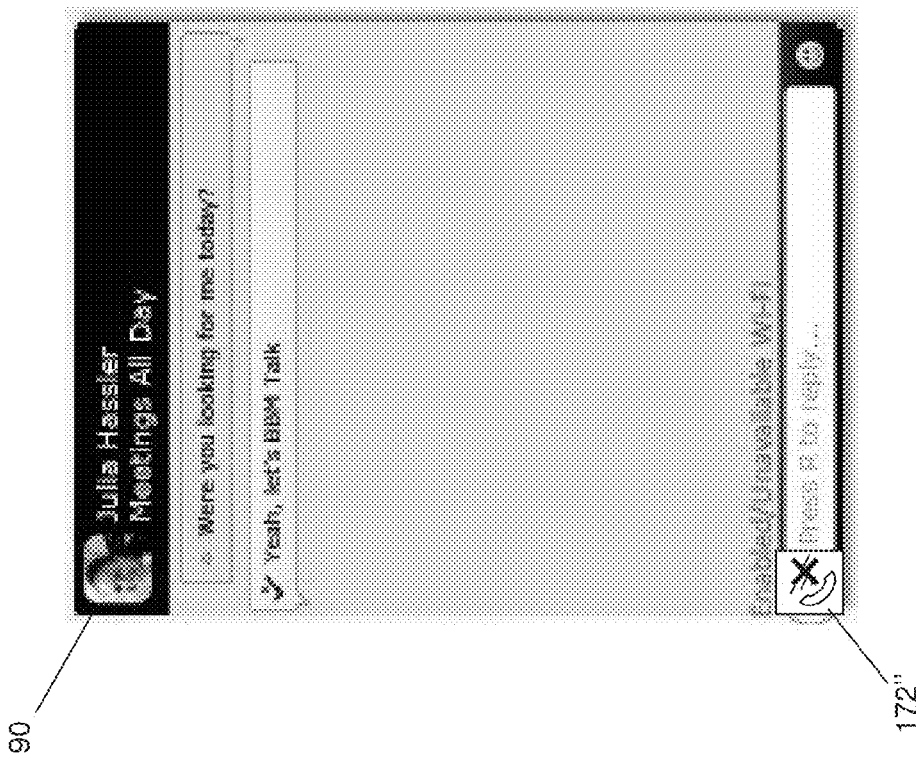
FIG. 23 is an example of an IM conversation UI.
Figure 22:
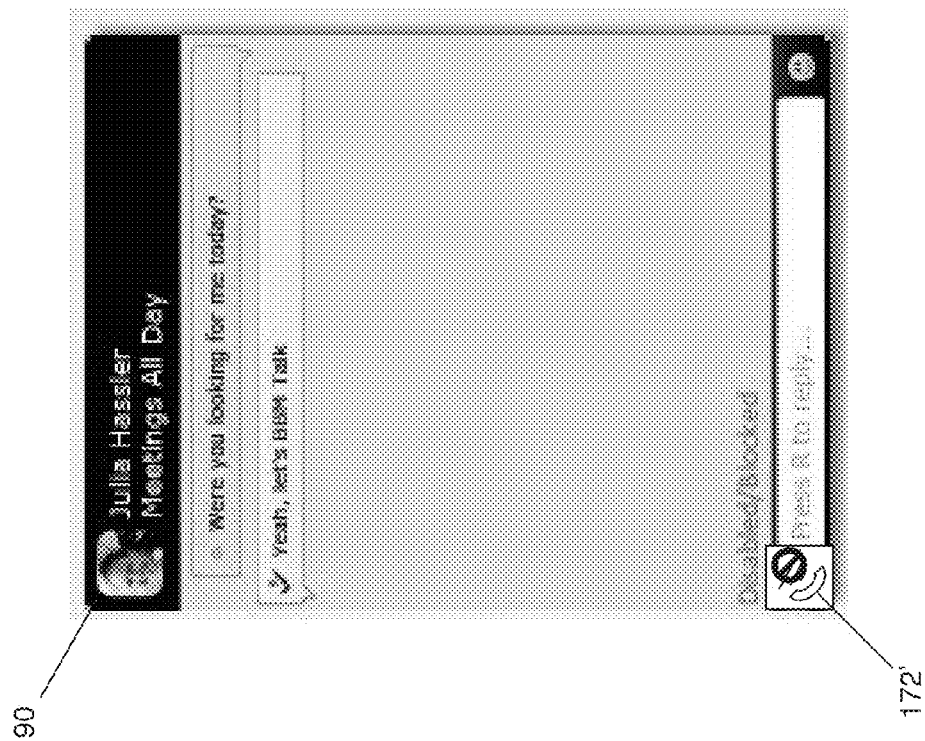
FIG. 22 is an example of an IM conversation UI.

FIG. 21 illustrates an IM conversation UI 90 for a chat with a contact that has been approved for IM voice communications. The IM conversation UI 90 in this example displays the third version 103''' of the feature icon 103, and a voice icon 172 in the message composition portion 100. The voice icon 172 may be used to indicate that IM voice communications have been enabled for the contact, and may be altered to signify a relative strength of a Wi-Fi connection (in Wi-Fi based examples). For example, the voice icon 172' seen in FIG. 22 has been altered to indicate that IM voice communications are enabled for that contact but that a Wi-Fi connection is unavailable. In another example, the voice icon 172" seen in FIG. 23 has been altered to indicate that IM voice communications have been disabled. Disablement of the IM voice communications may occur, for example, if the enable option 132 of FIG. 18 has been deselected at mobile device 10, if the contact does not have a version of the IM application 44 supporting IM voice communications, the contact has deselected a similar enable option 132 on their mobile device 10, the user has been blocked by the contact, etc It can be appreciated that a video only and/or video and voice examples may also utilize the UIs shown in FIGS. 18-23.

Returning now to the example wherein both video and voice calling functionality are provided, FIG. 24 illustrates a conversation menu 180 that has been invoked within an IM conversation UI 90. The conversation menu 180 includes a Contact Julie Hassler option 182, which when selected or highlighted displays a contact type sub-menu 184. The sub-menu 184 includes, in this example, a Start Voice Call option 186 for initiating a voice call using the IM application 44. FIG. 25 illustrates a list view menu 190 that has been invoked within the list view UI 102. The list view menu 190 includes a Block Contact from Calls option 192, which when selected enables the user to block the contact highlighted within the list view UI 102 from contacting the user with voice and video calling using the IM application 44. By selecting the Block Contact from Calls option 192, a block confirmation 194 may be displayed as shown in FIG. 26. By selecting a Block button 196, the highlighted contact is blocked, and by selecting a Cancel button 198, the block operation may be canceled.

When a contact has been blocked, a block indicator 200 may be displayed in the IM list view UI 102, in association with the blocked contact, as shown in FIG. 27. The block indicator 200 provides information directly in the IM list view UI 102 regarding which contacts have been blocked to enable users to see this information at a glance for all contacts.

Once a contact has been blocked, by selecting the corresponding list view entry 202 that contact from the IM list view UI 102 as shown in FIG. 28, the list view menu 190 is displayed as shown in FIG. 29, which includes an Unblock Contact from Calls option 204. By selecting the Unblock Contact from Calls option 204, the block indicator 200 is removed from the list view entry 200 as shown in FIG. 30, and the corresponding contact is able to make voice and/or video calls to the user using the IM application 44.

Figures 30, 31:
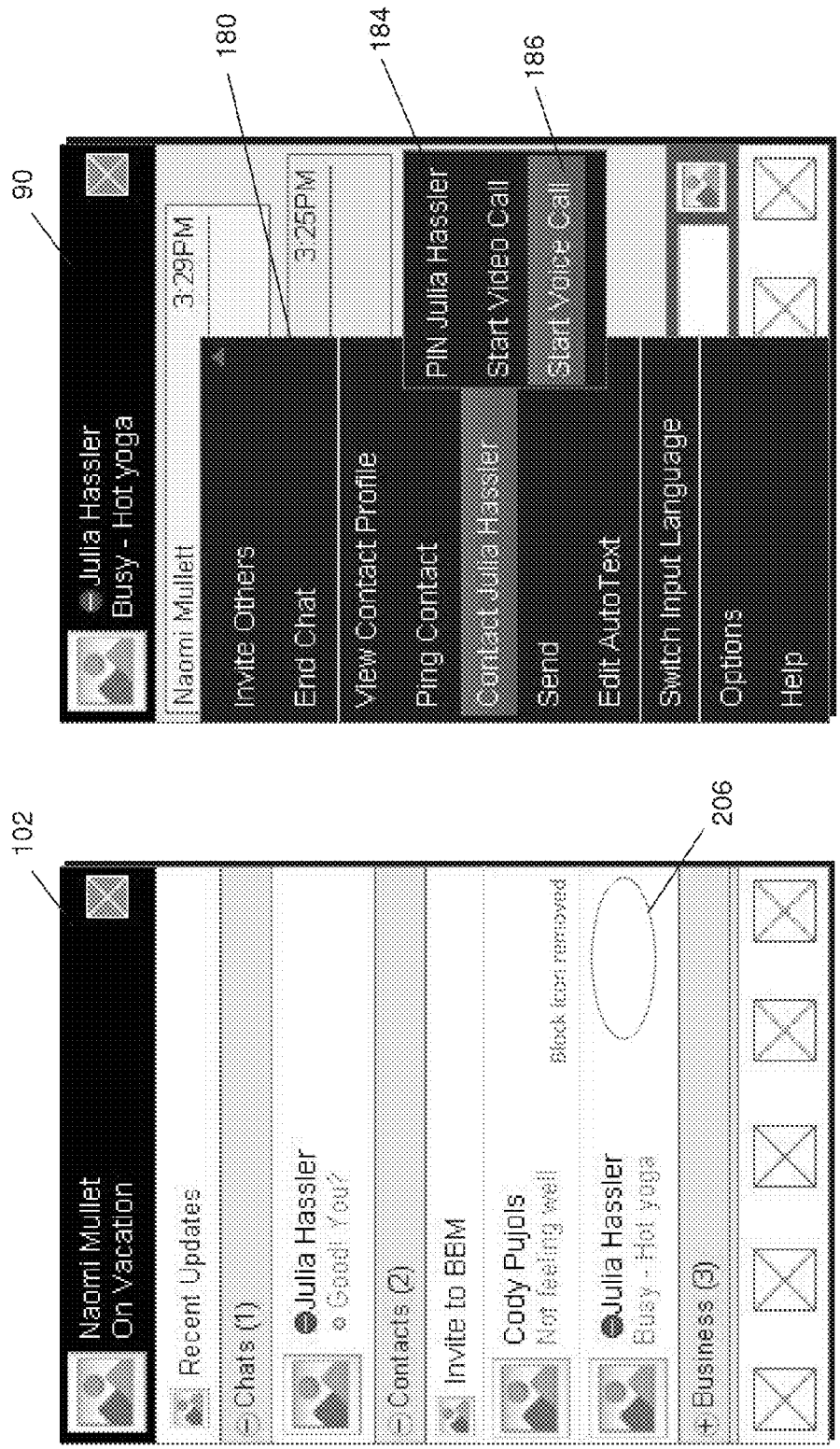
FIG. 30 is an example of an IM list view UI illustrating removal of a blocked icon subsequent to unblocking that contact.
FIG. 31 is an example of an IM conversation UI and a menu of options including an option for contacting a contact associated with the IM conversation view.

FIG. 31 illustrates invocation of the conversation menu 180. By selecting the Start Voice Call option 186 from the sub-menu 184, a call UI 208 may be displayed as shown in FIG. 32. The call UI 208 includes a call status indicator 210, and a call type indicator 212 as illustrated in FIG. 32. It can be appreciated that the call UI 208 can be a custom UI for other media communications via the IM application, 44 or can utilize the look and feel of another phone UI used for cellular-based voice communications.

Figures 34, 35:
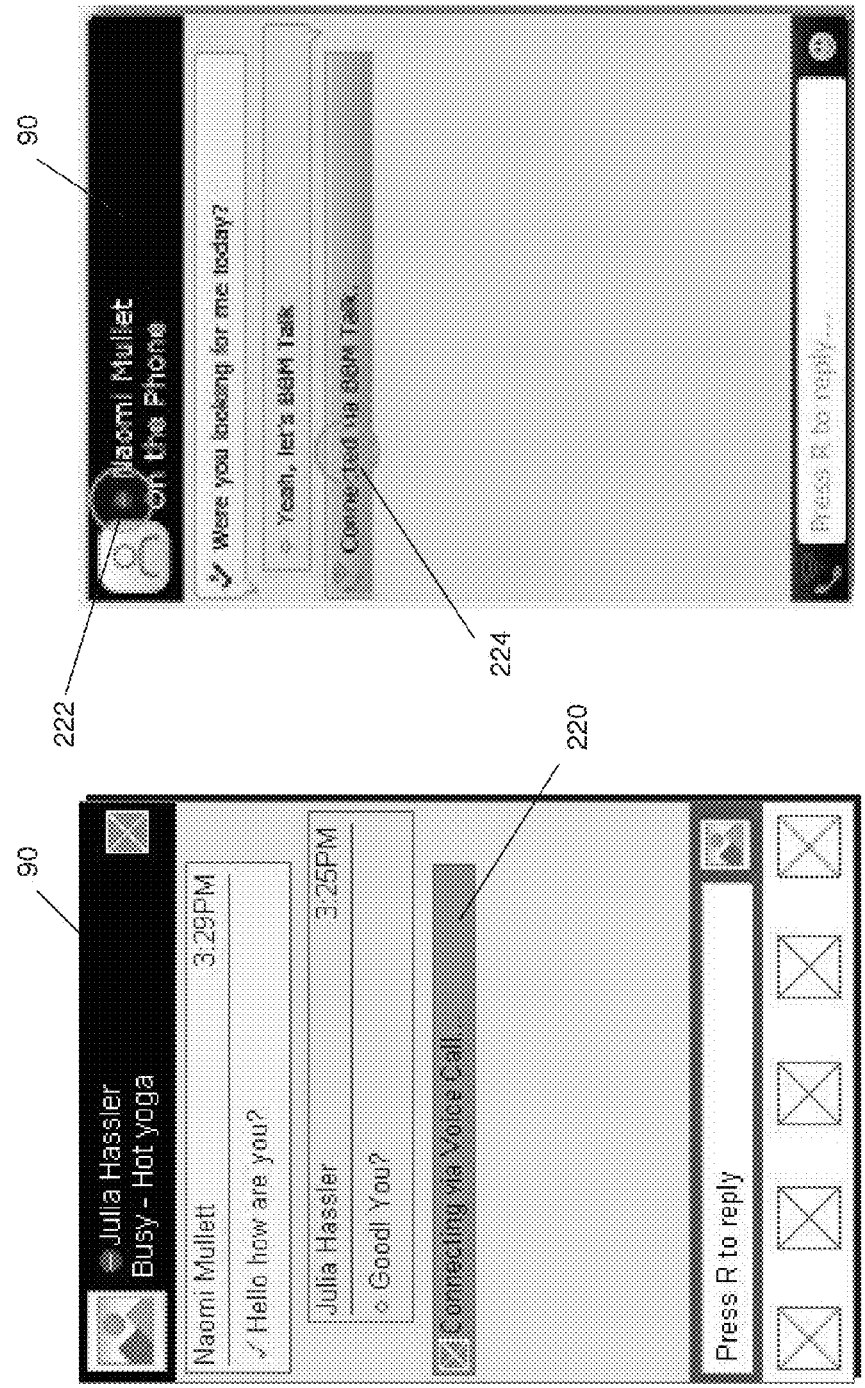
FIG. 34 is an example of an IM conversation UI including a message providing a call connection status.
FIG. 35 is an example of an IM conversation UI showing a message indicating that a call has been connected and a busy presence indicator.

FIG. 33 illustrates an incoming call UI 214 that is displayed when an incoming voice call is detected at the mobile device 10. In one example, the incoming call UI 214 is similar to an incoming call screen used for cellular-based calls and may includes an IM voice identifier 215 to enable the recipient of the initiated call to identify that the call is being made using the VoIP functionality 46. The incoming call UI 214 includes a Ringer Off option 216 for turning off an audible notification indicating the incoming call, and an Ignore option 218. The Ignore option 218 allows the user to ignore or otherwise reject the incoming call, but allow a communication session to be picked up or started from within an IM conversation UI 90 as will be illustrated further below. As an incoming call is being received, the user may also exit the screen showing the incoming call UI 214 (e.g., by selecting a convenience key, shortcut key, menu option, etc.), which brings the user back to the IM conversation UI 90 as shown in FIG. 34. Since the incoming call is currently being connected, an connecting call message 220 may be displayed in the conversation at a chronologically relevant point in the IM conversation being displayed. The connecting call message 220 is used to provide call information in the conversation in a manner that is consistent with the other portions of the conversation and in a familiar format, namely by resembling a normal incoming or outgoing message. If a call is connected, the connecting call message 220 is replaced with or modified to provide a connected call message 224 as shown in FIG. 35. The connecting call message 220 and connected call message 224 may indicate the type of call that is being/has been connected as illustrated in FIGS. 34 and 35.

Figures 36, 37:
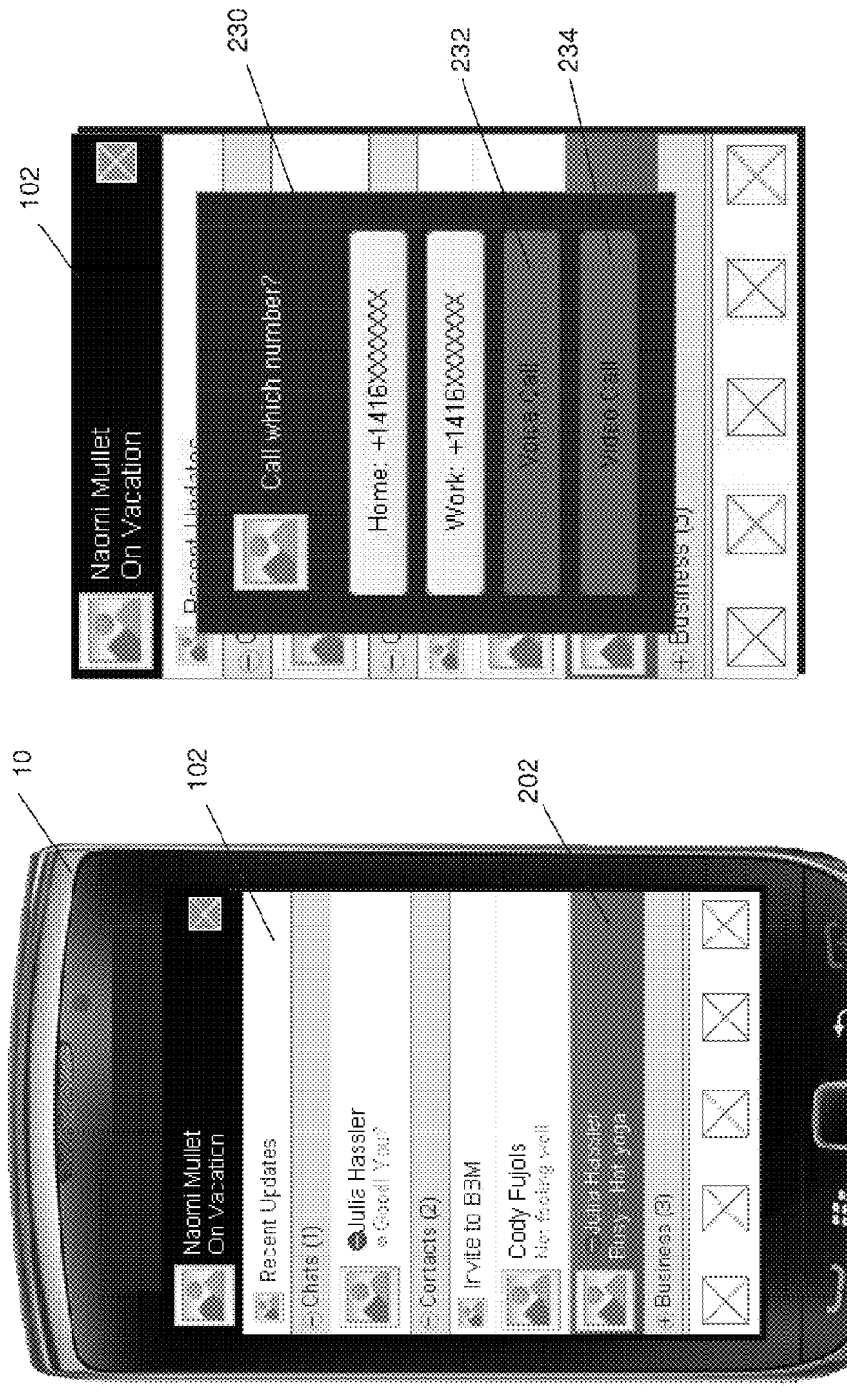
FIG. 36 is an example of an exterior plan view of a mobile communication device.
FIG. 37 is an example of an IM list view UI and a call selection prompt.
Figure 41:
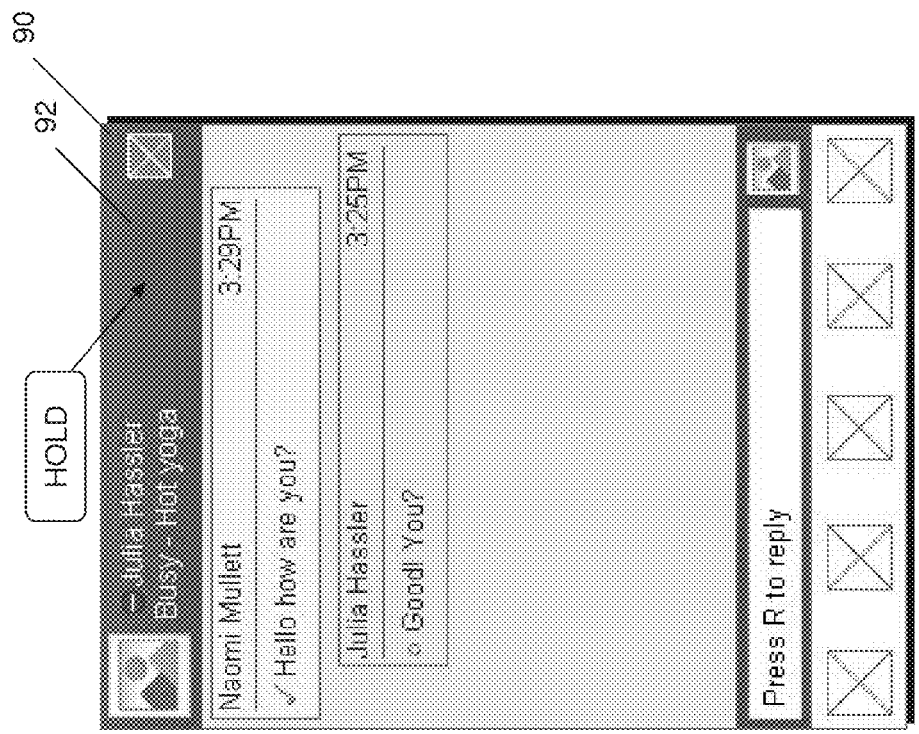
FIG. 41 is an example of an IM conversation UI.

Voice and video calls can be initiated from the IM application 44 in various ways. For example, as shown in FIG. 36, while the IM list view UI 102 is being displayed, an input mechanism such as a call button 226 provided on the exterior of a mobile device 10 may be selected after highlighting a particular contact list entry 202. If the contact associated with the contact list entry 202 is linked or otherwise associated with another database of contact details such as an address book, a call numbers prompt 230 may be displayed as shown in FIG. 37, In the example shown in FIG. 37, the call numbers prompt 230 includes a home number option, a work number option (obtained from the address book), as well as a voice call option 232 and a video call option 234. The voice call and video call options 232, 234 correspond to the calling functionality provided by the IM application 44 and, when enabled, are selectable from the call numbers prompt 230. FIG. 37 illustrates an example wherein both voice and video calling are disabled and thus the options 232, 234 are both grayed out. FIG. 38 illustrates and example wherein both voice and video calling are enabled and thus the options 232, 234 are selectable from the call numbers prompt 230. Selection of an option, e.g., by selecting the voice call option 232 as shown in FIG. 38, the call UI 208 is displayed. It can be appreciated that by exiting from the call UI 208, the IM conversation UI 90 can be displayed, similar to when the incoming call UI 214 is being displayed.

Figure 40:
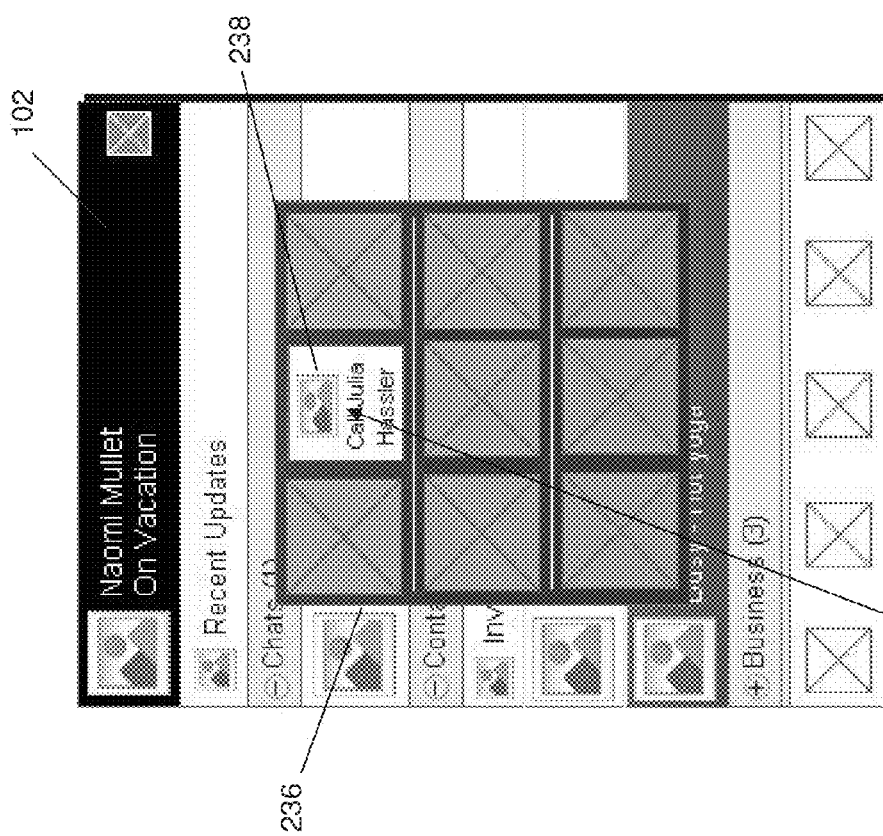
FIG. 40 is an example of an IM list view UI and a graphical menu that may be invoked therein.

An IM-based voice or video call may be initiated using various other mechanisms, as illustrated in FIGS. 39 to 42. For example, as shown in FIG. 39, by pressing and holding selection of a contact list entry 202 from the IM list view UI 102, a first graphical menu 236 may be displayed as shown in FIG. 40. The first graphical menu 236 in FIG. 40 includes a Call Julia Hassler option 238, which may be selected to obtain calling options for the particular contact. In another example, shown in FIG. 41, by holding a selection made in the banner portion 92 of the IM conversation UI 90, a second graphical menu 240 may be displayed as shown in FIG. 42. It can be appreciated that although the first and second graphical menus 236, 240 are illustrated as having different options and different numbers of options, the same graphical menu could also be used in both scenarios. The second graphical menu 240 shown in FIG. 42 includes a video call option 242, a voice call option 244, and a send option 246. By selecting either the video call option 242 or voice call option 244, the call UI 208 is initiated. By selecting the send option 246 as shown in FIG. 42, a send prompt 250 may be displayed as shown in FIG. 43.

The send prompt 250 enables the user to send a picture to the contact associated with the IM conversation UI 90 by selecting a picture option 252. The send prompt 250 may also include a voice notes option 254 to enable a voice note to be generated and sent to the contact instead of initiating a live call. Further detail illustrating the generation of a voice note is provided below.

Connection of an IM video or voice communication can also automatically trigger a change in IM presence status. The change of presence status may be reflected in the IM list view UI 102 as shown in FIG. 44, wherein a list entry 260 for the contact shows that the contact is on the phone. Since the mobile device 10 may enable both cellular calls and IM-based video and voice calls, blocking IM-based calls when the user is on a cellular call can avoid an unwanted disruption. It can be appreciated that this automatic change of presence status to "on the phone" can be done at both ends of the call, and that other presence identifiers may be used such as "on a call" or "on a video call", etc. In the example shown in FIG. 44, both the user of the mobile device 10 (i.e. Naomi Mullet) and the contact (i.e. Julia Hassler) are both showing a presence status of "on the phone". It can be appreciated that a presence icon in the banner portion 92 of the IM conversation UI 90 may also be updated to show that the contact is on the phone.

When an IM voice communication has ended, the call UI 108 may also be updated to show a disconnection message (not shown), and the call UI 108 may be operable to close after a predetermined amount of time has passed since the call was disconnected. The IM conversation UI 90 may also be updated after a call has ended, as shown in FIG. 45, by displaying a disconnected message 256 (or by altering or updating a connecting call message 220 or connected call message 224). As shown in FIG. 46, the disconnected message 264 may also include call details 266 such as how long the call lasted. It can be appreciated that the IM application 44 may be configured such that a blocked contact would see a disconnected message 256 in their IM conversation UI 90 with the user that has blocked them.

In some example scenarios, the recipient of the IM voice communication has allowed the caller to call them, but that contact cannot call the caller in return. For example, the recipient may not have been added the list 146 (see FIG. 19) and, as such, IM voice communications from that contact would be blocked. In such a scenario, a disconnection message 264 may be displayed with a prompt 266 to enable the user to unblock or otherwise allow the contact to call the user, as shown in FIG. 47. An allow button 268 may be provided to enable the user to approve an update to the relationship data to have the contact approved for participating in voice and/or video calls, which would be reflected graphically by an addition of the contact to the list 146. In one example, after detecting selection of the allow button 268, the IM application 44 displays a contact addition message 272 as shown in FIG. 48, which includes an OK button 274 to approve the addition, and a cancel button 276 to abort or discard the proposed addition.

Figures 48, 49:
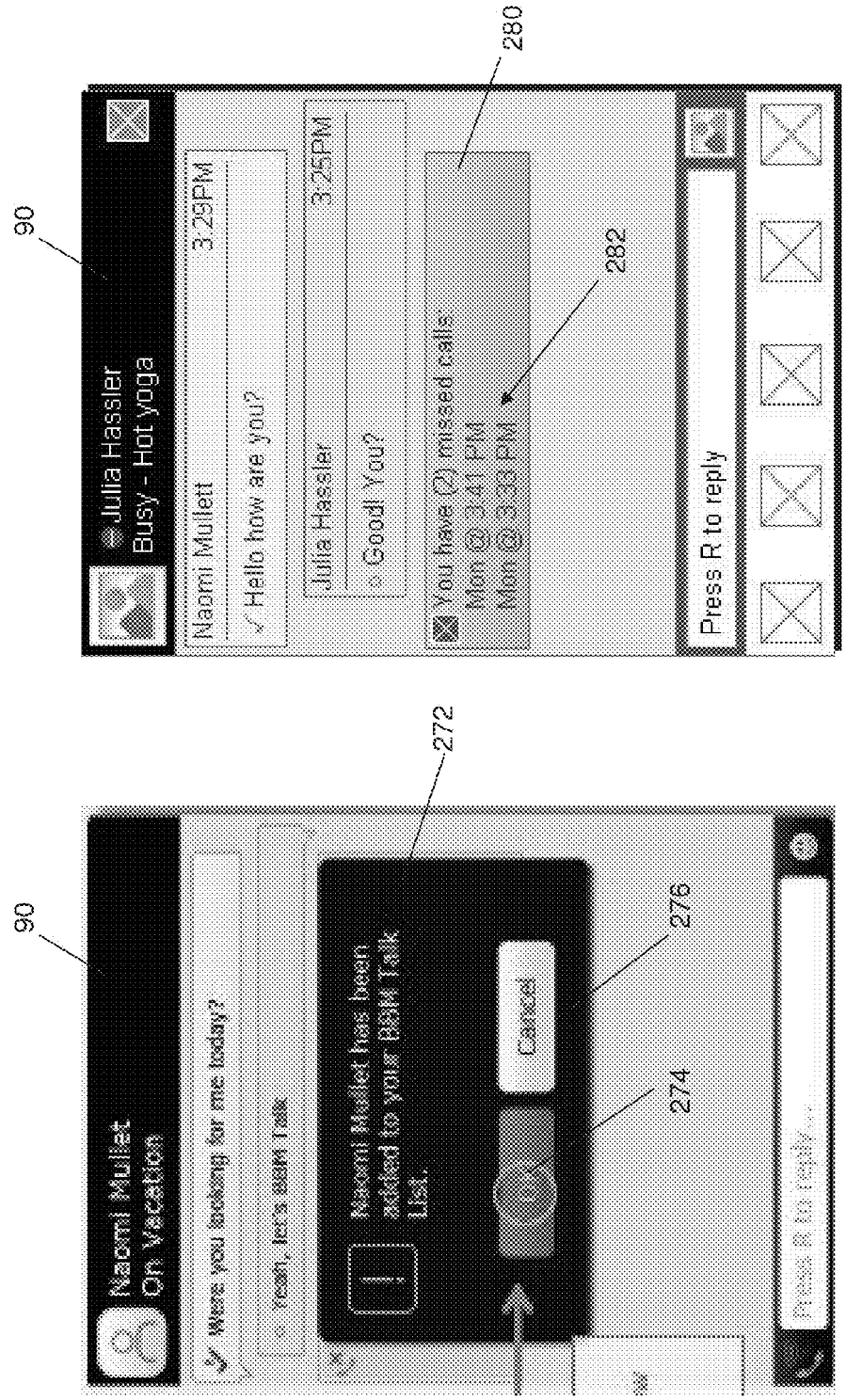
FIG. 48 is an example of an IM conversation UI showing a contact addition message.
FIG. 49 is an example of an IM conversation UI including a message indicating multiple missed calls.

When IM voice communications are not connected, the IM conversation UI 90 can be updated to indicate missed calls as shown in FIG. 49, by displaying a missed calls message 280. In one example, if a missed call is detected for a contact with which the user does not have a current conversation, a new conversation may be created in order to provide the missed call details. As shown in FIG. 49, time information 282 for a plurality of missed calls may be displayed in the same missed calls message 280, e.g., if more than one missed call is detected by the IM application 44 before the next IM message 64 is sent or received.

FIG. 50 illustrates the incoming call UI 214. By selecting the Ignore option 218 as shown in FIG. 50, the IM conversation UI 90 may be automatically populated with a default, predefined message 284 in the message composition portion 100 as shown in FIG. 51. The automatic population of the message composition portion 100 enables the user to not only hand off an incoming call to an existing IM conversation, but also to quickly and conveniently notify the caller that they have acknowledged the attempt at a call. Such an acknowledgement encourages the caller to send a message rather than make repeated attempts to establish a voice or video call. The IM conversation UI 90 therefore provides a convenient forum in which to negotiate a mutually agreeable time at which to establish the voice or video call without the aforementioned repeated attempts.

Figures 52, 53:
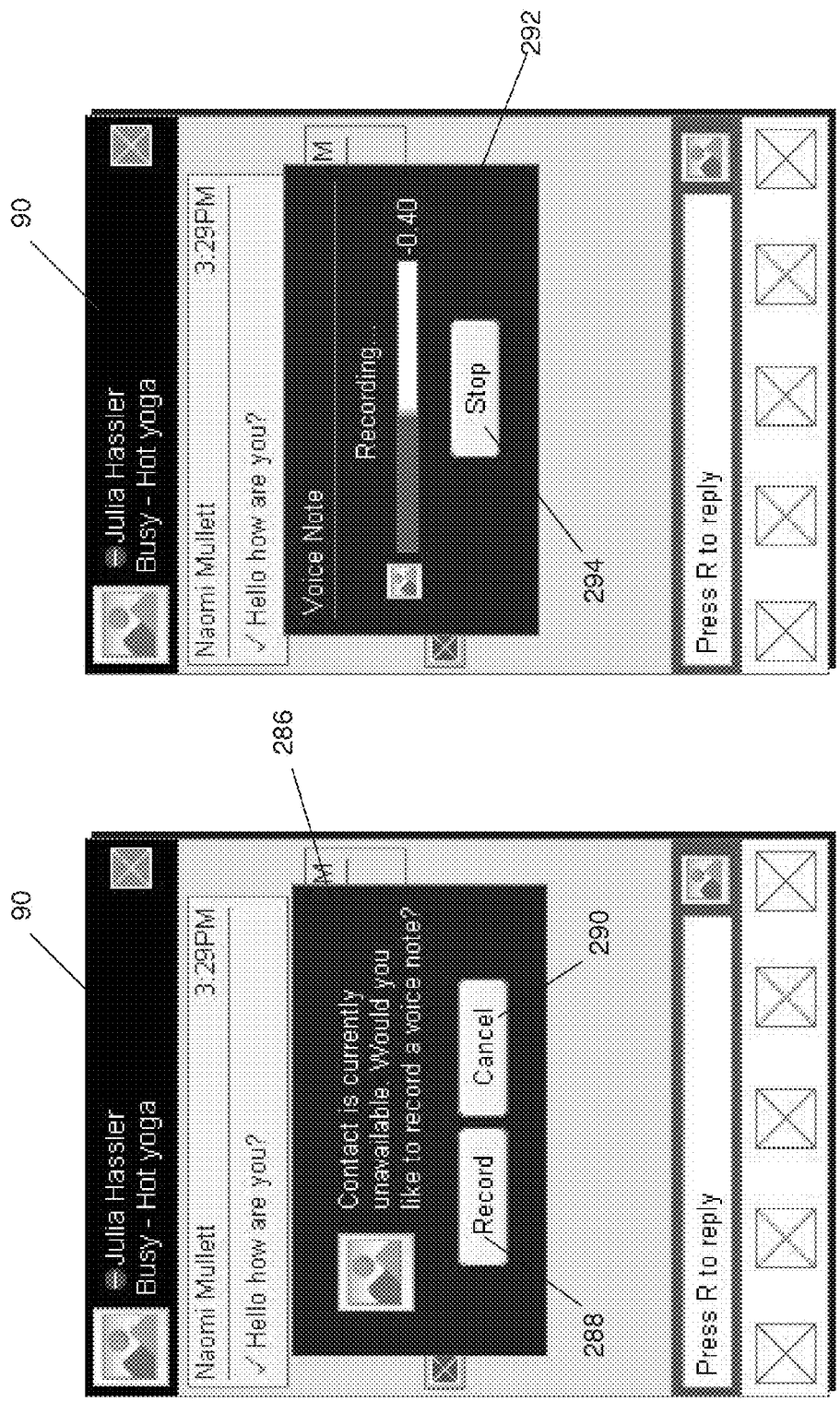
FIG. 52 is an example of an IM conversation UI and a prompt to enable a voice note to be recorded.
FIG. 53 is an example of an IM conversation UI and a voice note status bar.
Figures 54, 55:
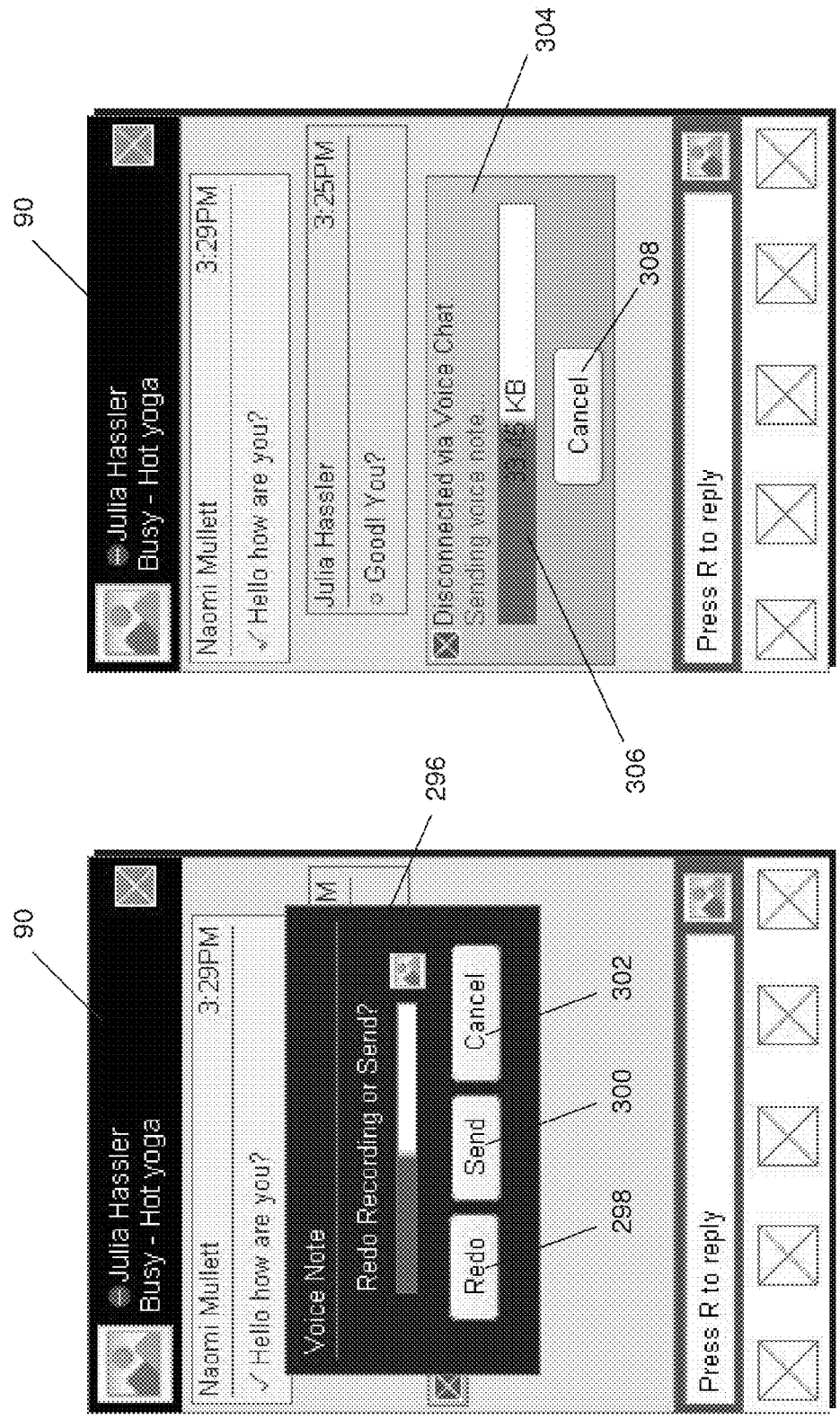
FIG. 54 is an example of an IM conversation UI and a voice note status bar with an option to redo the voice note.
FIG. 55 is an example of an IM conversation UI including a message showing a progress bar related to sending a voice note.
Figure 56:
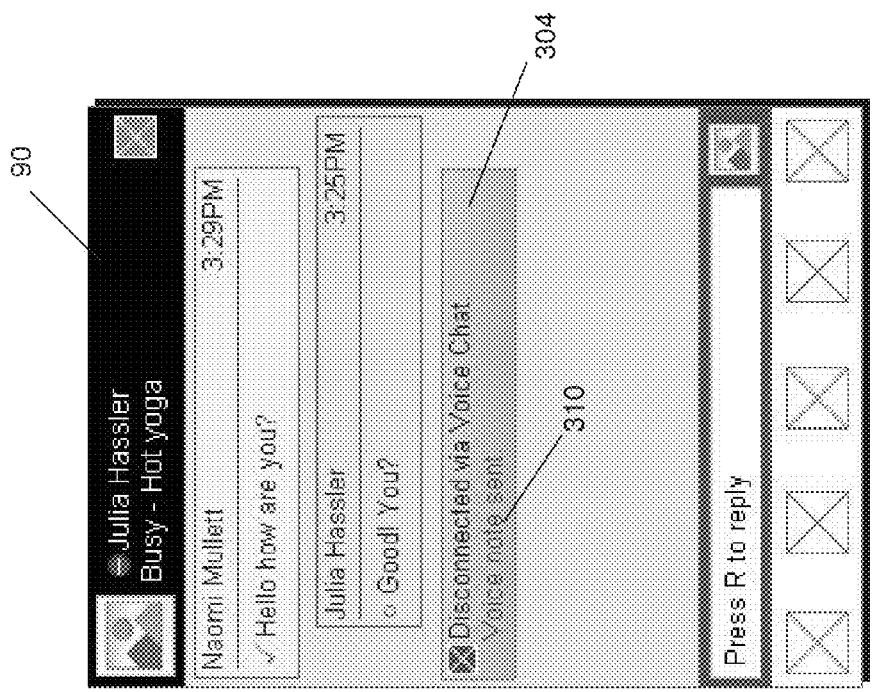
FIG. 56 is an example of an IM conversation UI including a message indicating that a voice note has been sent.

As discussed above, a voice note may be generated and sent from one mobile device 10 to another. In one example scenario, after disconnecting a call attempt, the user may be prompted to record a voice note, similar to leaving a voicemail in a traditional telephone call. FIG. 52 illustrates a voice notes prompt 286, which provides a Record button 288, and a Cancel button 290. By selecting the Record button 288, a first voice note recorder UI 292 may be displayed as shown in FIG. 53, which graphically depicts a recording progress and number of seconds/minutes elapsed in the recording. A Stop button 294 is also provided to enable the user to control when they wish to stop the recording. When the recording has been stopped, a second voice note recorder UI 296 is shown (or the first voice note recorder UI 292 modified or updated) as shown in FIG. 54. A Redo button 298 may be selected to re-record the voice note, a Send button 300 may be selected to send the voice note to the contact, and a Cancel button 302 may be selected to end the voice note recording session without sending the recorded voice note to the selected contact. By selecting the Send button 300, the current disconnected call message 304 is updated to include a transmission progress bar 306 as shown in FIG. 55. A Cancel button 308 may be selected to cancel or abort sending the voice note while the transmission is in progress. After the voice note has been sent the disconnected call message 304 may be further updated to include a voice note sent indication 310 as shown in FIG. 56. At the other end of the communication, the IM conversation UI 90 may be updated to include a Play Voice Note link 312 in a missed call message 280.

Figures 58, 59:
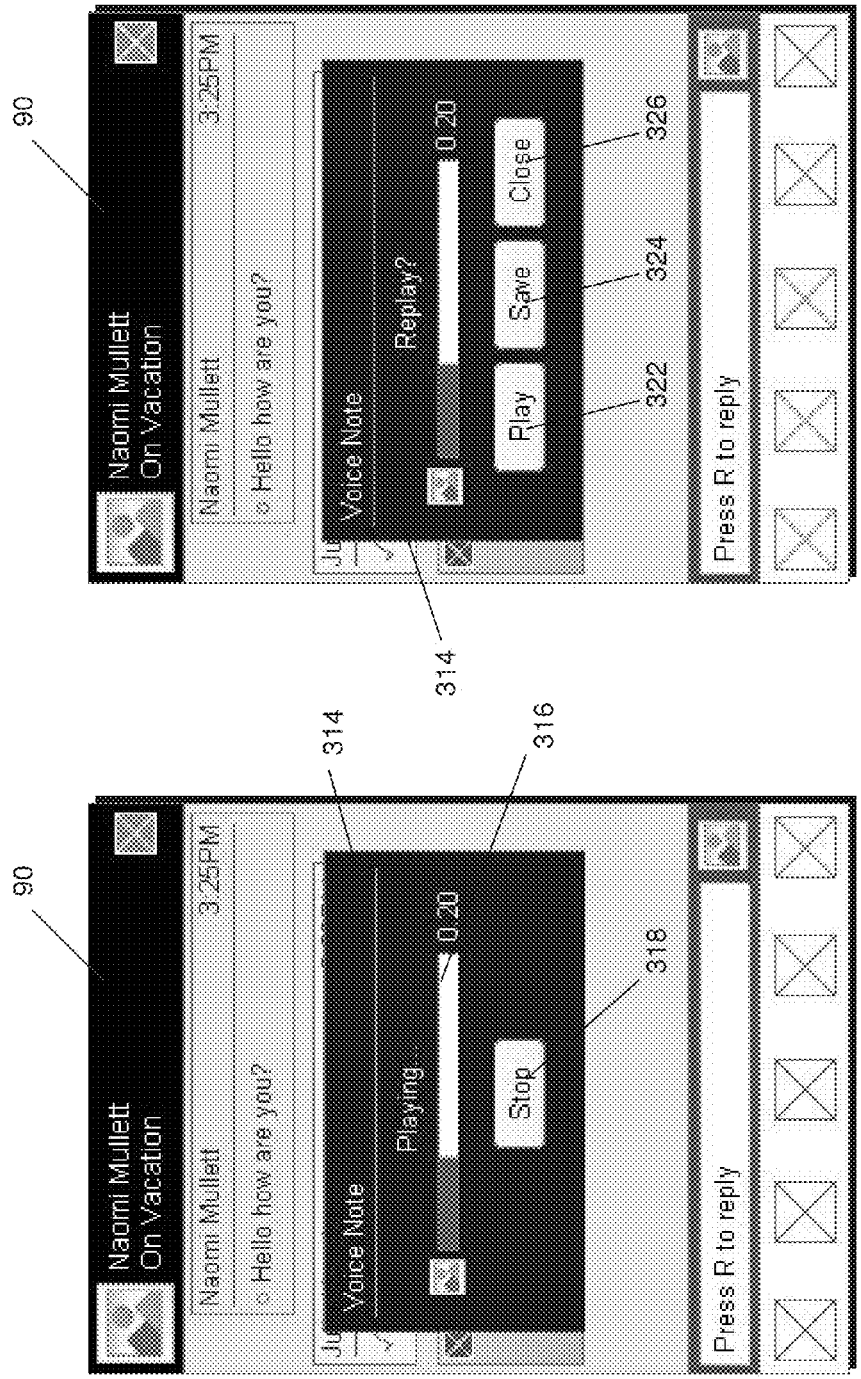
FIG. 58 is an example of an IM conversation UI including a voice note player.
FIG. 59 is an example of an IM conversation UI including a voice note player with an option to replay the voice note.

By selecting the Play Voice Note link 312, a voice note player UI 314 is initiated as shown in FIG. 58, which includes a voice note progress bar 316 and a Stop button 318 for controlling playback of the voice note. Once the voice note has finished playing (or has been stopped), the voice note player UI 314 may be updated as illustrated in FIG. 59 to include a Play button 322 to allow playback of the voice note to resume or start over, a Save button 324 to enable the recipient to store a copy of the voice note, and a Close button 326 to close the voice note player UI 314. After a voice note has been played, the missed call message 280 may be further updated to include an indication 328 that the voice note has been played as shown in FIG. 60. It can be appreciated that as illustrated in FIG. 60, the indication 328 may also be selectable in order to allow the voice note to be replayed.

As discussed above, the IM application 44 may be configured to block incoming voice and video calls to the user when a presence status in the IM application 44 is set to "busy". When IM voice communications are blocked in this way, missed call messages 280 may be displayed in a manner similar to what is shown in FIG. 60. The IM application 44 may be configured to include an option or preference for blocking calls in this manner and may be applied only to outgoing calls. The IM application 44 may also be configured to not affect outgoing calls such that the user can still make outgoing calls while having a busy presence status.

In addition to blocking calls based on an existing presence status, a new presence status may be added when IM voice and/or video communications have been enabled. For example, as shown in FIG. 61, a "chat only" presence status option 336 may be provided as an entry in a list of presence status options in a presence status menu 334. "Chat only" presence status option 336 indicates that a user of mobile device 10 does not want to, or cannot talk with other contacts, but are otherwise available to chat using IM. The presence status menu 334 can be accessed in various ways, for example in a contact profile UI (not shown).

In one example, selection of the chat only presence status option 336 operates to block incoming IM voice communications instead of, or in addition to, a busy presence status, and missed calls may be shown using missed call messages 280 in a manner similar to what is shown in FIG. 60. The IM list view UI 102 can also be updated to provide a chat only presence indicator 338 as shown in FIG. 62. In another example, selection of the chat only presence status option 336 operates to provide a busy signal if a contact attempts to initiate an incoming call with the user of mobile device 10. In yet another example, selection of the chat only presence status option 336 initiates the sending of a message from mobile device 10 to each of the relevant contacts, the message signifying that call initiation to mobile device 10 should be restricted until such time as another message is received that indicates that calls are no longer to be restricted. When the chat only presence status option 336 is utilized, any incoming calls made to the user can appear as missed calls in a missed calls message of the caller as shown in FIG. 63. It can be appreciated that when voice and video calls are blocked via a presence status selection, voice notes may still be sent as shown in FIG. 63, and the connected, connecting, and disconnecting status messages can be omitted from the IM conversation UI 90.

Figure 64:
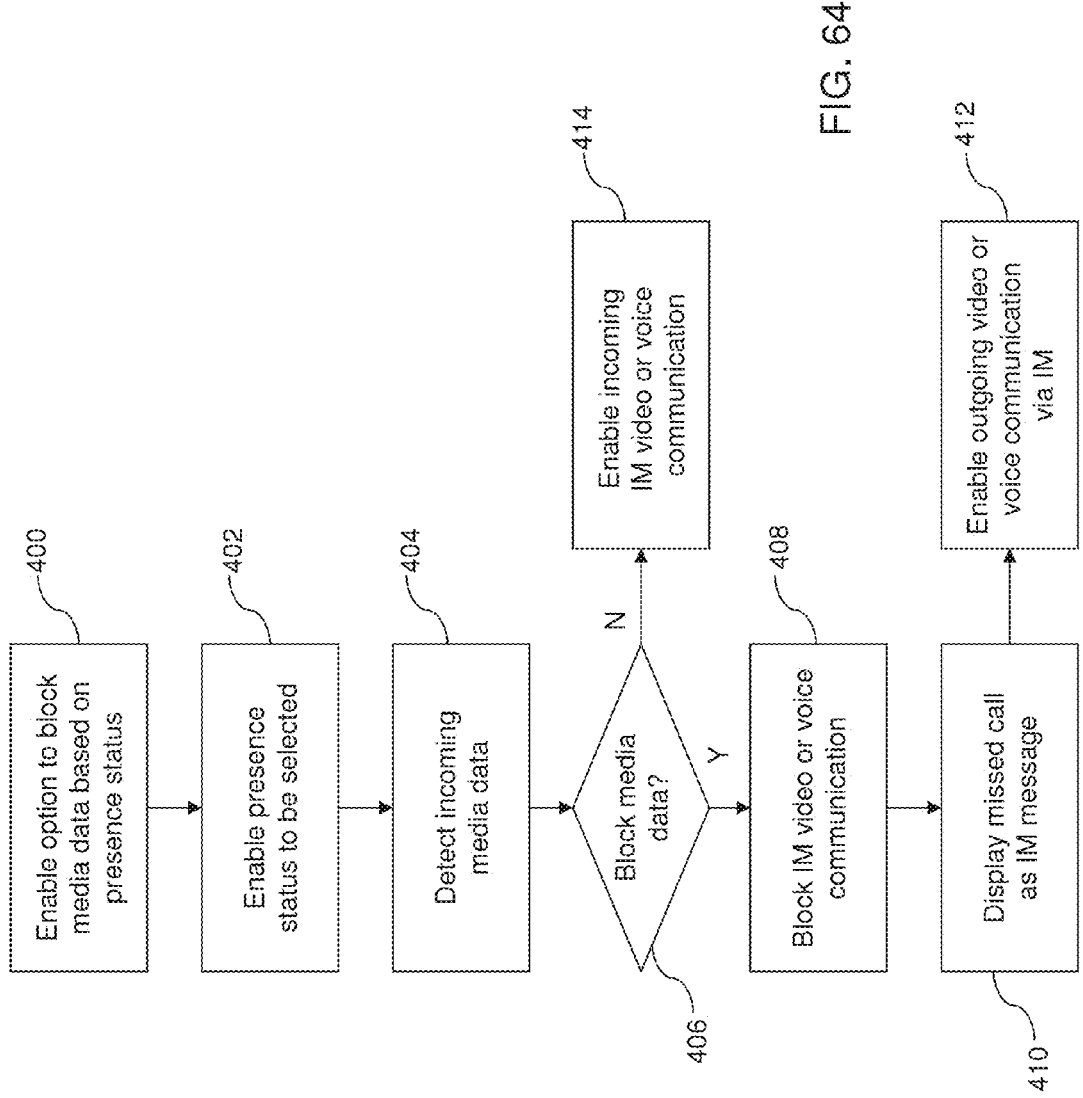
FIG. 64 is a flow chart illustrating example computer executable operations that may be performed in enabling IM voice calls to be blocked according to a presence status setting.

FIG. 64 illustrates an example of a set of computer executable operations that may be performed in enabling IM voice calls to be blocked according to a presence status setting. At 400, an option to block media data 42 based on a presence status is enabled. At 402, the IM application 44 enables presence status options to be selected (e.g., by providing access to the presence selection menu 334). At 404, the IM application 44 detects incoming media data 42 (e.g., a voice or video call connection request), and determines at 406 whether or not to block the media data 42. For example, the media data 42 may be blocked after determining that the presence status in the IM application 44 has been set to busy or chat only as discussed above. If the media data 42 is to be blocked, the associated IM voice or video communication is blocked at 408, and the missed call is displayed as an IM message at 410. As discussed above, in one example, despite blocking the incoming IM voice and/or video communications, outgoing IM voice and/or video communications may still be initiated from the IM application 44 at 412. If the incoming media data 42 detected at 406 is accepted, the incoming IM voice or video communication is enabled at 414.

Figure 65:
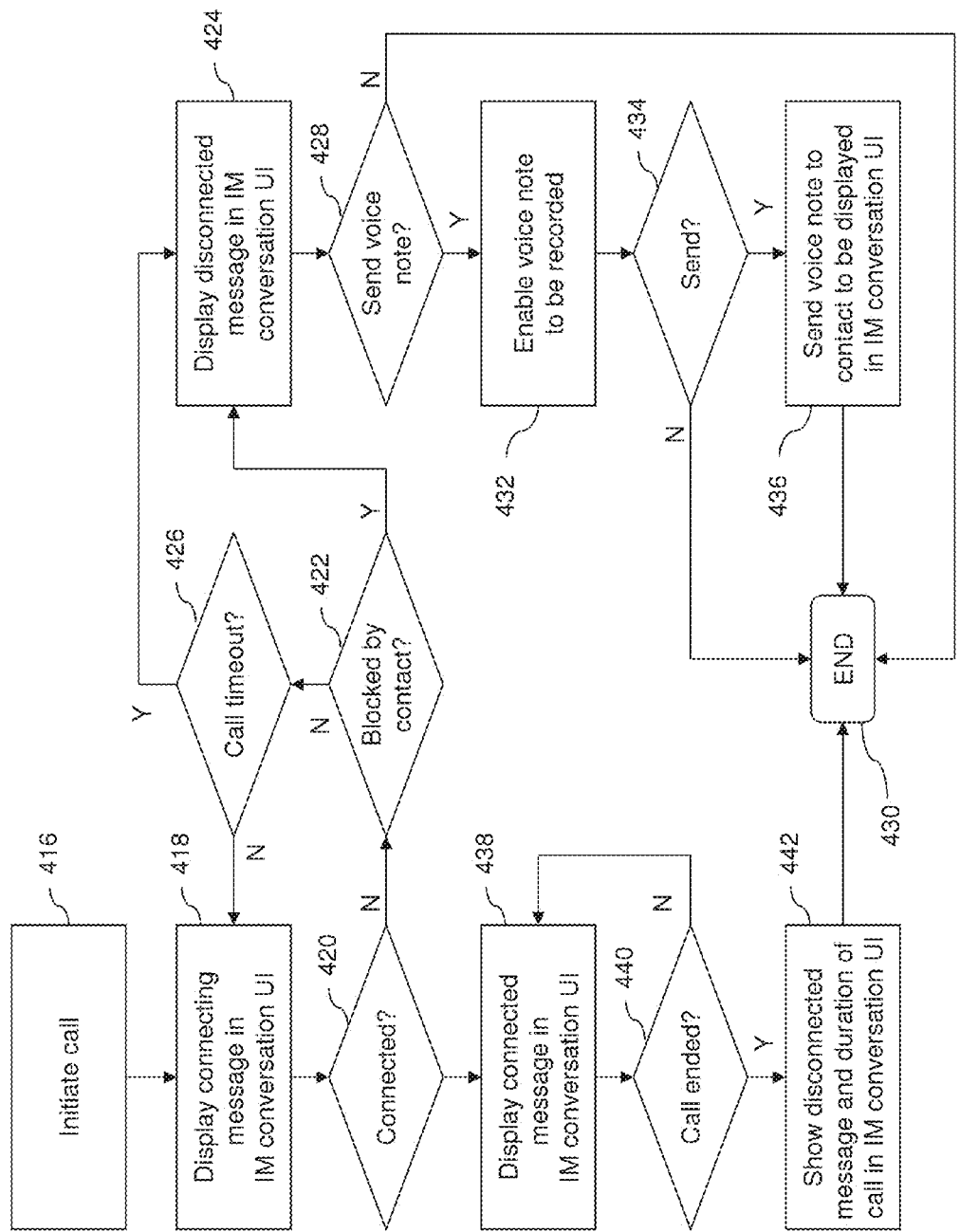
FIG. 65 is a flow chart illustrating an example computer executable operations that may be performed in populating an IM conversation UI with messages for indicating call connection statuses.

FIG. 65 illustrates example computer executable operations that may be performed by an IM application 44 in updating the IM conversation UI 90 to include call connection and missed call statuses for voice and video calls. At 416, the IM application 44 initiates a voice or video call and displays a connecting message 220 at 418. The IM application 44 determines at 420 whether or not the call has been connected. If not, the IM application 44 determines at 422 whether or not the call has been blocked by the contact being called. If the call has been blocked (e.g., due to a chat only presence status, inclusion in a blocked list of contacts, etc.), a disconnected message 256, 264 is displayed in the IM conversation UI 90 at 424. If the call is not blocked or otherwise not connected due to a connection problem, the IM application 44 determines at 426 whether or not the call attempt has timed out (e.g., a predetermined number of "rings" has occurred). If the call has not yet timed out, the process returns to 418 and the connecting message 220 remains displayed in the IM conversation UI 90. If the call has timed out, the disconnected message 256 is displayed at 424. It can be appreciated that when a call is blocked or the call attempt times out, the duration of the call would not be included in the disconnected message 256. However, it can be appreciated that additional information may be included to identify the reason for the disconnection.

Figure 57:
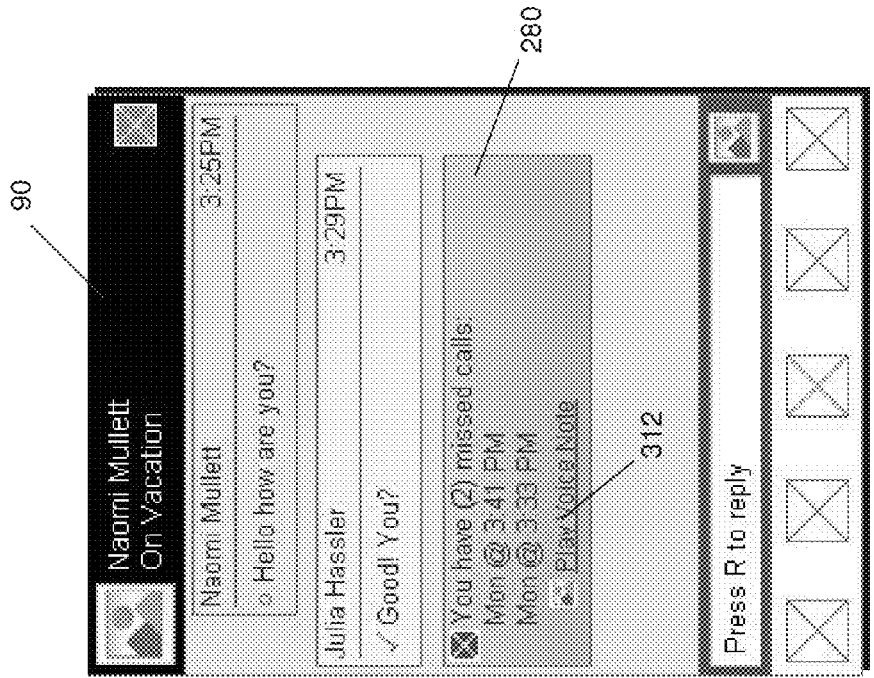
FIG. 57 is an example of an IM conversation UI including a message with a link for playing a received voice note.

When a call is not connected, e.g., due to a call attempt time out, the IM application 44 may enable a user to send a voice note to the contact. At 428, the IM application 44 determines if a voice note is to be sent, e.g., by displaying a prompt 286 as shown in FIG. 52. If a voice note is not to be sent, the process ends at 430. If a voice note is to be sent, the IM application 44 enables the voice note to be recorded at 432, and determines at 434 if the recorded voice note is to be sent. If not, the process ends at 430. If the voice note is to be sent, the recorded voice note is sent to the contact at 436 such that a voice note link 312 can be displayed in a missed call message 280 in the IM conversation UI 90 of the contact, as shown in FIG. 57. The process ends at 430 after sending the voice note.

If the call attempt is successful and the call is connected, at 420, a connected message 224 is displayed in the IM conversation UI 90, at 438. The IM application 44 determines, at 440, if the call that has been connected has ended. If not, the connected message 224 continues to be displayed, at 438. Once the call ends, the IM application 44 displays, at 442, a disconnected message 256, 264 in the IM conversation UI 90, with time information 266 including the duration of the call. As discussed above, the disconnected message 264 may also include an allow button 268 if the callee is currently blocked from contacting the caller via voice or video calling using the IM application 44. The process ends, at 430, after the call ends and the disconnected message 256, 264 is displayed.

As discussed above, when the call attempt is unsuccessful, due to the callee having blocked the caller, the callee having set the IM presence status to "chat only", the callee ignoring or otherwise not answering the call, etc.; a missed call message 280 (and optionally time information 282 related to the missed call) is displayed by the IM application 44 in the IM conversation UI 90.

Accordingly, there is provided a method comprising: enabling a particular presence status option to be selected from a plurality of presence status options in an instant messaging application; and blocking an incoming voice or video communication to the instant messaging application when the particular presence status option has been selected.

There is also provided a computer readable storage medium comprising computer executable instructions for: enabling a particular presence status option to be selected from a plurality of presence status options in an instant messaging application; and blocking an incoming voice or video communication to the instant messaging application when the particular presence status option has been selected.

There is also provided an electronic device comprising a processor, memory, and a communication module, the memory comprising computer executable instructions to: enable a particular presence status option to be selected from a plurality of presence status options in an instant messaging application; and block an incoming voice or video communication to the instant messaging application when the particular presence status option has been selected.

There is also provided a method comprising: displaying a first instant message in an instant messaging conversation user interface comprising call status information; and displaying updated call status information in the instant messaging conversation user interface after determining whether an call attempt has been successful.

There is also provided a computer readable storage medium comprising computer executable instructions for: displaying a first instant message in an instant messaging conversation user interface comprising call status information; and displaying updated call status information in the instant messaging conversation user interface after determining whether an call attempt has been successful.

There is also provided an electronic device comprising a processor, memory, and a communication module, the memory comprising computer executable instructions to: display a first instant message in an instant messaging conversation user interface comprising call status information; and display updated call status information in the instant messaging conversation user interface after determining whether an call attempt has been successful.

Referring to FIG. 66, to further aid in the understanding of the examples described, shown therein is a block diagram of an example configuration of a mobile device 10. The mobile device 10 includes a number of components such as a main processor 502 that controls the overall operation of the mobile device 10. Communication functions, including data and voice communications, are performed through a communication interface 40. The communication interface 40 receives messages from and sends messages to a wireless network 12. In this example of the mobile device 10, the communication interface 40 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 40 with the wireless network 12 represents one or more different Radio Frequency (RF) channels, operating according to defined protocols specified for GSM/GPRS communications.

The main processor 502 also interacts with additional subsystems such as a Random Access Memory (RAM) 506, a flash memory 508, a touch-sensitive display 560, an auxiliary input/output (I/O) subsystem 512, a data port 514, a keyboard 516 (physical, virtual, or both), a speaker 518, a microphone 520, a GPS receiver 521, short-range communications subsystem 522, and other device subsystems 524. Some of the subsystems of the mobile device 10 perform communication-related functions, whereas other subsystems may provide "resident" or on-device functions. By way of example, the touch-sensitive display 560 and the keyboard 516 may be used for both communication-related functions, such as entering a text message for transmission over the wireless network 12, and device-resident functions such as a calculator or task list. In one example, the mobile device 10 can include a non touch-sensitive display in place of, or in addition to the touch-sensitive display 560. For example the touch-sensitive display 560 can be replaced by a displayer 24 that may not have touch-sensitive capabilities.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module component or "smart card" 526, such as a Subscriber Identity Module (SIM), a Removable User Identity Module (RUIM) and a Universal Subscriber Identity Module (USIM). In the example shown, a SIM/RUIM/USIM 526 is to be inserted into a SIM/RUIM/USIM interface 528 in order to communicate with a network.

The mobile device 10 is typically a battery-powered device and includes a battery interface 532 for receiving one or more rechargeable batteries 530. In at least some examples, the battery 530 can be a smart battery with an embedded microprocessor. The battery interface 532 is coupled to a regulator (not shown), which assists the battery 530 in providing power to the mobile device 10. Although current technology makes use of a battery, future technologies such as micro fuel cells may provide the power to the mobile device 10.

The mobile device 10 also includes an operating system 534 and software components 536 to 542, 36, and 38. The operating system 534 and the software components 536 to 542, 36, and 38, that are executed by the main processor 502 are typically stored in a persistent store such as the flash memory 508, which may alternatively be a read-only memory (ROM) or similar storage element (not shown). Those skilled in the art will appreciate that portions of the operating system 534 and the software components 536 to 542, 36, and 38, such as specific device applications, or parts thereof, may be temporarily loaded into a volatile store such as the RAM 506. Other software components can also be included, as is well known to those skilled in the art.

The subset of software applications 536 that control basic device operations, including data and voice communication applications, may be installed on the mobile device 10 during its manufacture. Software applications may include a message application 538, a device state module 540, a Personal Information Manager (PIM) 542, and a communication application 36, which includes or otherwise has access to an other media component 38. A message application 538 can be any suitable software program that allows a user of the mobile device 10 to send and receive electronic messages, wherein messages are typically stored in the flash memory 508 of the mobile device 10. A device state module 540 provides persistence, i.e. the device state module 540 ensures that important device data is stored in persistent memory, such as the flash memory 508, so that the data is not lost when the mobile device 10 is turned off or loses power. A PIM 542 includes functionality for organizing and managing data items of interest to the user, such as, but not limited to, e-mail, contacts, calendar events, and voice mails, and may interact with the wireless network 12.

Other types of software applications or components 539 can also be installed on the mobile device 10. These software applications 539 can be pre-installed applications (i.e. other than message application 538) or third party applications, which are added after the manufacture of the mobile device 10. Examples of third party applications include games, calculators, utilities, etc.

The additional applications 539 can be loaded onto the mobile device 10 through at least one of the wireless network 12, the auxiliary I/O subsystem 512, the data port 514, the short-range communications subsystem 522, or any other suitable device subsystem 524.

The data port 514 can be any suitable port that enables data communication between the mobile device 10 and another computing device. The data port 514 can be a serial or a parallel port. In some instances, the data port 514 can be a Universal Serial Bus (USB) port that includes data lines for data transfer and a supply line that can provide a charging current to charge the battery 530 of the mobile device 10.

For voice communications, received signals are output to the speaker 518, and signals for transmission are generated by the microphone 520. Although voice or audio signal output is accomplished primarily through the speaker 518, the displayer 24 can also be used to provide additional information such as the identity of a calling party, duration of a voice call, or other voice call related information.

The touch-sensitive display 560 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 560 is a capacitive touch-sensitive display which includes a capacitive touch-sensitive overlay 564. The overlay 564 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 58 of the touch-sensitive display 560 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 560. The processor 502 may determine attributes of the touch, including a location of a touch. Touch location data may include an area of contact or a single point of contact, such as a point at or near a center of the area of contact, known as the centroid. A signal is provided to the controller 566 in response to detection of a touch. A touch may be detected from any suitable object, such as a finger, thumb, appendage, or other items, for example, a stylus, pen, or other pointer, depending on the nature of the touch-sensitive display 560. The location of the touch moves as the detected object moves during a touch. One or both of the controller 566 and the processor 502 may detect a touch by any suitable contact member on the touch-sensitive display 560. Similarly, multiple simultaneous touches, are detected.

In some examples, an optional force sensor 570 or force sensors is disposed in any suitable location, for example, between the touch-sensitive display 560 and a back of the mobile device 10 to detect a force imparted by a touch on the touch-sensitive display 560. The force sensor 570 may be a force-sensitive resistor, strain gauge, piezoelectric or piezoresistive device, pressure sensor, or other suitable device.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, any component of or related to the communication system 4, etc., or accessible or connectable thereto. Any application or module herein described may be implemented using computer readable/executable instructions that may be stored or otherwise held by such computer readable media.

It will be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above principles have been described with reference to certain specific example embodiments, various modifications thereof will be apparent to those skilled in the art as outlined in the appended claims.

The invention claimed is:

1. A method comprising:
presenting a presence status menu on a communication device, the presence status menu providing options in an instant messaging application;
receiving selection of a particular presence status option from a plurality of presence status options in the presence status menu, the particular presence status option, when selected, enabling selective blocking of an incoming communication based on media type of the incoming communication, such that a voice or video over internet protocol communication is blocked, while allowing an incoming instant message text-based communication; and
responsive to the selection of the particular presence status option by a user of the communication device:
automatically changing the presence status of the user that appears on each communication device of a list of instant messaging contacts to unavailable when the user is connected to an instant messaging voice or video communication;
detecting an incoming voice or video over internet protocol communication;
blocking the incoming voice or video communications to the instant messaging application while allowing incoming instant message text-based communications; and
identifying the blocked incoming voice or video communication in an instant message text-based communication to the user of the communication device;
responsive to a setup of a blocked list of designated contacts by the user:
blocking incoming voice or video over internet protocol communication from any designated contacts in the blocked list;
initiating an outgoing voice or video internet protocol communication to a designated contact in the blocked list using the instant messaging application; and
upon an end of the outgoing voice or video communication, presenting a disconnection message, the disconnection message including a prompt to remove the designated contact from the blocked list of instant messaging contacts.

2. The method of claim 1, further comprising: initiating an outgoing voice or video over internet protocol communication to a contact in a regular list of instant messaging contacts using the instant messaging application; in response to disconnecting the outgoing voice or video communication that has been attempted, providing a prompt to record a voice note; and sending the voice note to the contact.

3. The method of claim 1, further comprising:
presenting a single feature icon for the user of the communication device in the list of instant messaging contacts indicating that instant messaging voice or video communication is enabled for the user of the communication device along with an indicator that Wi-Fi is unavailable.

4. The method of claim 1, further comprising:
presenting a single feature icon for the user of the communication device in the list of instant messaging contacts indicating that instant messaging voice or video communication is enabled for the user of the communication device along with a strength indicator for Wi-Fi.

5. A non-transitory computer readable storage medium comprising computer executable instructions for:
presenting a presence status menu on a communication device, the presence status menu providing options in an instant messaging application;
receiving selection of a particular presence status option from a plurality of presence status options in the presence status menu, the particular presence status option, when selected, enabling selective blocking of an incoming communication based on media type of the incoming communication, such that a voice or video over internet protocol communication is blocked, while allowing an incoming instant message text-based communication; and
responsive to the selection of the particular presence status option by a user of the communication device:
automatically changing the presence status of the user that appears on each communication device of a list of instant messaging contacts to unavailable when the user is connected to an instant messaging voice or video communication;

detecting an incoming voice or video over internet protocol communication;

blocking the incoming voice or video communication to the instant messaging application while allowing incoming instant message text-based communications; and identifying the blocked incoming voice or video communication in an instant message text-based communication to the user of the communication device;

responsive to a setup of a blocked list of designated contacts by the user:

blocking incoming voice or video over internet protocol communication from any designated contacts in the blocked list;

initiating an outgoing voice or video internet protocol communication to a designated contact in the blocked list using the instant messaging application; and upon an end of the outgoing voice or video communication, presenting a disconnection message, the disconnection message including a prompt to remove the designated contact from the blocked list of instant messaging contacts.

6. The non-transitory computer readable storage medium comprising computer executable instructions of claim 5, further comprising computer instructions for: initiating an outgoing voice or video over internet protocol communication to a contact in a regular list of instant messaging contacts using the instant messaging application; in response to disconnecting the outgoing voice or video communication that has been attempted, providing a prompt to record a voice note; and sending the voice note to the contact.

7. The non-transitory computer readable storage medium comprising computer executable instructions of claim 5, further comprising computer instructions for:

presenting a single feature icon for the user of the communication device in the list of instant messaging contacts indicating that instant messaging voice or video communication is enabled for the user of the communication device but that Wi-Fi is unavailable.

8. The non-transitory computer readable storage medium comprising computer executable instructions of claim 5, further comprising computer instructions for:

presenting a single feature icon for user of the communication device in the list of instant messaging contacts indicating that instant messaging voice or video communication is enabled for the user of the communication device along with a strength indicator for Wi-Fi.

9. An electronic device comprising a processor, memory, and a communication module, the memory comprising computer executable instructions to:

presenting a presence status menu on a communication device, the presence status menu providing options in an instant messaging application;

receiving selection of a particular presence status option from a plurality of presence status options in the presence status menu, the particular presence status option, when selected, enabling selective blocking of an incoming communication based on media type of the incoming communication, such that a voice or video over internet protocol communication is blocked, while an incoming instant message text-based communication is allowed; and responsive to the selection of the particular presence status option by a user of the communication device:

automatically changing the presence status of the user that appears on each communication device of a list of instant messaging contacts to unavailable when the user of the communication device is connected to an instant messaging voice or video communication;

detecting an incoming voice or video over internet protocol communication;

blocking the incoming voice or video communication to the instant messaging application while allowing incoming instant message text-based communications; and identifying the blocked incoming voice or video communication in an instant message text-based communication to the user of the communication device;

responsive to a setup of a blocked list of designated contacts by the user;

blocking incoming voice or video over internet protocol communication from any designated contacts in the blocked list;

initiating an outgoing voice or video internet protocol communication to a designated contact in the blocked list using the instant messaging application; and upon an end of the outgoing voice or video communication, presenting a disconnection message, the disconnection message including a prompt to remove the designated contact from the blocked list of instant messaging contacts.

10. The electronic device of claim 9, further comprising computer executable instructions to: initiate an outgoing voice or video over internet protocol communication to a contact in a regular list of instant messaging contacts using the instant messaging application; in response to disconnecting the outgoing voice or video communication that has been attempted, provide a prompt to record a voice note; and send the voice note to the contact.

11. The electronic device of claim 9, further comprising computer executable instructions to:

present a single feature icon for the user of the communication device in the list of instant messaging contacts indicating that instant messaging voice or video communication is enabled for the user of the communication device along with an indication that Wi-Fi is unavailable.

12. The electronic device of claim 9, further comprising computer executable instructions to:

present a single feature icon for the user of the communication device in the list of instant messaging contacts indicating that instant messaging voice or video communication is enabled for the user of the communication device along with a strength indicator for Wi-Fi.

13. A method comprising:

presenting a presence status menu on a communication device, the presence status menu providing options in an instant messaging application;

receiving selection of a particular presence status option from the presence status menu, the particular presence status option, when selected, enabling selective blocking of an incoming communication based on media type of the incoming communication, such that a voice or video over internet protocol communication is blocked, while allowing an incoming instant message text-based communication;

displaying a first instant message in an instant messaging conversation user interface comprising call status information;
displaying updated call status information in the instant messaging conversation user interface after determining whether a call attempt has been successful;
responsive to the selection of the particular presence status option by a user of the communication device:
 automatically changing a presence status of the user that appears on each communication device of a list of instant messaging contacts to unavailable when the user is connected to an instant messaging voice or video communication;
 blocking an incoming voice or video over internet protocol communication to the instant messaging application while allowing incoming instant message text-based communications; and
 identifying the blocked incoming voice or video communication in an instant message text-based communication to the user of the communication device;
responsive to a setup of a blocked list of designated contacts by the user:
 blocking incoming voice or video over internet protocol communication from any designated contacts in the blocked list;
 initiating an outgoing voice or video internet protocol communication to a designated contact in the blocked list using the instant messaging application; and
 upon an end of the outgoing voice or video communication, presenting a disconnection message, the disconnection message including a prompt to remove the designated contact from the blocked list of instant messaging contacts.

14. A non-transitory computer readable storage medium comprising computer executable instructions for:
 presenting a presence status menu on a communication device, the presence status menu providing options in an instant messaging application;
 receiving selection of a particular presence status option from the presence status menu, the particular presence status option, when selected, enabling selective blocking of an incoming communication based on media type of the incoming communication, such that a voice or video over internet protocol-communication is blocked, while allowing an incoming instant message text-based communication;
 displaying a first instant message in an instant messaging conversation user interface of a communication device comprising call status information;
 displaying updated call status information in the instant messaging conversation user interface after determining whether a call attempt has been successful;
 responsive to the selection of the particular presence status option by a user of the communication device:
  automatically changing a presence status of a user that appears on each communication device of a list of instant messaging contacts to unavailable when the user is connected to an instant messaging voice or video communication;
  blocking a subsequent incoming voice or video over internet protocol communication to the instant messaging application, while allowing an incoming instant message text-based communication; and
  identifying the blocked incoming voice or video communication in an instant message text-based communication to the user of the communication device;
 responsive to a setup of a blocked list of designated contacts by the user:
  blocking incoming voice or video over internet protocol communication from any designated contacts in the blocked list;
  initiating an outgoing voice or video internet protocol communication to a designated contact in the blocked list using the instant messaging application; and
  upon an end of the outgoing voice or video communication, presenting a disconnection message, the disconnection message including a prompt to remove the designated contact from the blocked list of instant messaging contacts.

15. An electronic device comprising a processor, memory, and a communication module, the memory comprising computer executable instructions to:
 presenting a presence status menu on a communication device, the presence status menu providing options in an instant messaging application;
 receiving selection of a particular presence status option from the presence status menu, the particular presence status option, when selected, enabling selective blocking of an incoming communication based on media type of the incoming communication, such that a voice or video over internet protocol-communication is blocked, while allowing an incoming instant message text-based communication;
 display a first instant message in an instant messaging conversation user interface comprising call status information;
 display updated call status information in the instant messaging conversation user interface after determining whether a call attempt has been successful;
 responsive to the selection of the particular presence status option by a user of the communication device:
  automatically change a presence status of a user that appears on each communication device of a list of instant messaging contacts to unavailable when the user of the electronic device is connected to an instant messaging voice or video communication;
  blocking a subsequent incoming voice or video over internet protocol communication to the instant messaging application, while allowing an incoming instant message text-based communication; and
  identifying the blocked incoming voice or video communication in an instant message text-based communication to the user of the electronic device;
 responsive to a setup of a blocked list of designated contacts by the user:
  blocking incoming voice or video over internet protocol communication from any designated contacts in the blocked list;
  initiating an outgoing voice or video internet protocol communication to a designated contact in the blocked list using the instant messaging application; and
  upon an end of the outgoing voice or video communication, presenting a disconnection message, the disconnection message including a prompt to remove the designated contact from the blocked list of instant messaging contacts.

* * * * *